United States Patent
Xu et al.

(10) Patent No.: US 9,867,224 B2
(45) Date of Patent: Jan. 9, 2018

(54) METHOD AND APPARATUS FOR TRANSMITTING A HANDOVER REPORT AND AN RLF REPORT

(71) Applicant: Samsung Electronics Co., Ltd., Suwon-si, Gyeonggi-do (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/698,212

(22) Filed: Apr. 28, 2015

(65) Prior Publication Data

US 2015/0312813 A1    Oct. 29, 2015

(30) Foreign Application Priority Data

Apr. 29, 2014 (CN) .......................... 2014 1 0177271
Sep. 25, 2014 (CN) .......................... 2014 1 0498635

(51) Int. Cl.
*H04W 36/00* (2009.01)
*H04W 76/02* (2009.01)

(52) U.S. Cl.
CPC ..... *H04W 76/027* (2013.01); *H04W 36/0055* (2013.01)

(58) Field of Classification Search
CPC ...... H04W 36/00; H04W 76/02; H04W 36/32
USPC .................................................. 455/438–439
See application file for complete search history.

(56) References Cited

U.S. PATENT DOCUMENTS

| | | | |
|---|---|---|---|
| 8,615,241 B2 | 12/2013 | Gupta et al. | |
| 8,929,894 B2 * | 1/2015 | Catovic | H04W 76/027 370/216 |
| 9,001,716 B2 | 4/2015 | Xu et al. | |
| 2010/0173626 A1 | 7/2010 | Catovic et al. | |
| 2010/0173633 A1 | 7/2010 | Catovic et al. | |
| 2011/0250892 A1 | 10/2011 | Gupta et al. | |

(Continued)

FOREIGN PATENT DOCUMENTS

| | | |
|---|---|---|
| WO | 2013/127480 A1 | 9/2013 |
| WO | 2014/021671 A1 | 2/2014 |
| WO | 2014/046452 A1 | 3/2014 |

OTHER PUBLICATIONS

Huawei, Addition of Inter Rat MRO, 3GPP TSG-RAN WG3 Meeting #77, Aug. 13-17, 2012, R3-121648, Qingdao, China.

(Continued)

*Primary Examiner* — Michael T Vu
(74) *Attorney, Agent, or Firm* — Jefferson IP Law, LLP

(57) ABSTRACT

A method for transmitting a handover report and for transmitting a radio link failure (RLF) report are provided. The method includes obtaining, by a target base station, at least one of location information of a source cell or location information of a user equipment (UE) history cell during a handover procedure, and transmitting, by the target base station, the handover report to at least one of a source base station or to a base station where the UE history cell is located, according to the obtained at least one of location information of the source cell or the location information of the UE history cell, wherein the handover report including at least one of an unnecessary handover report, a too early handover report, or a handover to wrong cell report.

22 Claims, 12 Drawing Sheets

(56) References Cited

U.S. PATENT DOCUMENTS

| | | | |
|---|---|---|---|
| 2012/0069732 A1 | 3/2012 | Xu et al. | |
| 2012/0135734 A1* | 5/2012 | Ma | H04W 36/245 |
| | | | 455/436 |
| 2012/0327908 A1 | 12/2012 | Gupta et al. | |
| 2013/0003695 A1* | 1/2013 | Nylander | H04W 36/0083 |
| | | | 370/331 |
| 2013/0084892 A1* | 4/2013 | Teyeb | H04W 4/023 |
| | | | 455/456.6 |
| 2013/0150023 A1* | 6/2013 | Kim | H04W 36/32 |
| | | | 455/423 |
| 2013/0310046 A1* | 11/2013 | Wegmann | H04W 36/0083 |
| | | | 455/438 |

OTHER PUBLICATIONS

European Search Report dated Oct. 27, 2017, issued in the European Application No. 15786528.8.

* cited by examiner

METHOD AND APPARATUS FOR TRANSMITTING A HANDOVER REPORT AND AN RLF REPORT

CROSS-REFERENCE TO RELATED APPLICATION(S)

This application claims the benefit under 35 U.S.C. §119(a) of a Chinese patent application filed on Apr. 29, 2014 in the State Intellectual Property Office and assigned Serial number 201410177271.4, and a Chinese patent application filed on Sep. 25, 2014 in the State Intellectual Property Office and assigned Serial number 201410498635.9, the entire disclosure of each of which is hereby incorporated by reference.

TECHNICAL FIELD

The present disclosure relates to mobile communication systems. More particularly, the present disclosure relates to a method and an apparatus for transmitting a handover report and a radio link failure (RLF) report.

BACKGROUND

With the development of communication technologies, mobile communication systems are developed to be system architecture evolved (SAE) systems.

FIG. 1 illustrates a schematic diagram of an SAE system according to the related art.

Referring to FIG. 1, the system includes an evolved universal terrestrial radio access network (E-UTRAN) 101 and a core network that at least includes a mobility management entity (MME) 105 and a subscriber plane entity (serving gateway (S-GW)) 106. The E-UTRAN 101 is configured to connect a user equipment (UE) to the core network, and the E-UTRAN 101 includes more than one macro base station (evolved Node-B (eNB)) 102 and home base station (home eNB (HeNB)) 103, and optionally includes a home base station gateway (HeNB GW) 104. The MME 105 and the S-GW 106 may be integrated into a module or may be implemented separately and independently. The eNBs 102 are connected with each other by X2 interfaces, and are connected with the MME 105 and S-GW 106 by S1 interfaces respectively. An HeNB 103 is connected with the MME 105 and S-GW 106 directly by S1 interfaces, or is connected with the optional HeNB GW 104 by an S1 interface and then the HeNB GW104 is connected to the MME 105 and the S-GW 106 respectively by an S1 interface.

During an early stage of establishing an SAE system or during the operation of an SAE system, it costs a great amount of manpower and material resource configures to optimize parameters of the SAE system, especially radio parameters, so as to guarantee good coverage and capacity, mobility robustness, load balancing and a user equipment access rate during movement, and the like, of the SAE system. To save manpower and material resource configurations, currently an SAE system self-optimization method is proposed. During a self-optimization procedure, eNB or HeNB settings are optimized according to current status of an SAE system. The SAE system self-optimization method will be illustrated hereafter, and eNB and HeNB are abbreviated to eNB.

FIG. 2 is a flowchart illustrating a basic principle of performing self-optimization for an SAE system according to the related art.

Referring to FIG. 2, once an eNB is powered or accesses to the SAE system, the eNB may perform a self-configuration process. The process includes performing basic configuration and initial radio parameter configuration for the eNB. The basic configuration for the eNB includes configuration of an Internet protocol (IP) address of the eNB and detecting operations, administration, and management (OA&M), validation between the eNB and a core network, detecting an HeNB GW to which the eNB belongs when the eNB is an HeNB, downloading software and operating parameters of the eNB to perform self-configuration. Since the initial radio parameter configuration is implemented according to experience or simulation, thus the performance of respective eNBs of the SAE system will be influenced by environments of areas where the eNBs are located, so the eNBs need to specifically perform initial configuration of a neighbor list and initial configuration of load balance according to the environments of the areas where the eNBs are located. After the self-configuration process is completed, a lot of parameters configured for the eNBs may not be the most optimal, so to make the SAE system having better performance, the configuration of the eNBs needs to be optimized or adjusted, namely self-optimization of a mobile communication system. When the configuration of the eNBs is optimized or adjusted, the process may be carried out through backstage OA&M. There may be a standard interface between the OA&M and an eNB, and the OA&M needs to transmit optimized parameters through the interface to the eNB (may be an eNB or HeNB), then the eNB optimizes parameters of the eNB's configuration according to the optimized parameters. Of course, the process may be performed by the eNB itself. For example, the eNB obtains performance to be optimized by detection, and optimizes or adjusts parameters corresponding thereto. The eNB configuration optimization or adjustment may include: neighbor list self-optimization, coverage and capacity self-optimization, mobility robustness self-optimization, load balancing self-optimization, random access channel (RACH) parameter self-optimization, and the like.

A basic principle of mobility robustness self-optimization is as follows. If a radio link failure (RLF) or handover failure happens to a UE, when the UE enters into connected mode again, the UE notifies the network that there is an available RLF report, and the network transmits a message to the UE to request for the RLF report. The RLF report transmitted by the UE includes information on an E-UTRAN cell global identifier (ECGI) of a cell that serves the UE last, an ECGI of a cell that attempts to be reestablished, an ECGI of a cell that triggers a last handover procedure, time from triggering a last handover procedure to connection failure, a reason for connection failure being RLF or handover failure, radio measurement, and the like. A base station that obtains the RLF report from the UE forwards the RLF report obtained from the UE to a base station where the cell that serves the UE last is located. The base station that serves the UE last determines whether it is a too early handover, a too late handover, a handover to wrong cell, or covering leakage. If it is a too early handover or a handover to wrong cell, the base station transmits information on the too early handover or information on the handover to wrong cell to a source base station that triggers the too early handover or triggers the handover to wrong cell.

For mobility robustness optimization (MRO) between different radio access technologies (RAT), e.g., a too early handover from 3rd generation (3G) or 2nd generation (2G) to long term evolution (LTE), if shortly after a radio network controller (RNC) hands over the UE successfully to eNB1, an RLF happens to the UE at eNB1, when the UE accesses LTE next time, the UE transmits a UE RLF report to an eNB (e.g., eNB2) where the UE accesses LTE a second time, the eNB2 transmits an RLF indication message to the eNB1, and the eNB1 determines a reason for the failure. If it is a too early inter-RAT handover, then the eNB1 needs to transmit a handover report to a source RNC, and since the handover is carried out between different systems, the eNB1 needs to transmit the handover report to the source RNC through a core network. However, during transmission of the handover report, the following issue may occur. According to the RLF indication message transmitted from the eNB2 to the eNB1, the eNB1 only knows a cell identity of a source cell, but the eNB1 would not know other location information of the source cell, which results in that the eNB1 is unable to route the handover report to the source RNC.

Similarly, for transmission of a handover report of an unnecessary handover to another RAT, the issue caused by being unable to transmit the handover report due to not knowing the location information of a source cell of the handover exists too. Specifically, even if the coverage of E-UTRAN is good enough to satisfy requirements for the UE services, the UE still needs to be handed over to another RAT (e.g., global system for mobile communications (GSM) enhanced data rate for GSM evolution (EDGE) radio access network (GERAN), or universal terrestrial radio access network (UTRAN)). Such a handover is an unnecessary handover to another RAT. To detect the unnecessary handover to another RAT, when an inter-RAT handover from the E-UTRAN to another RAT is performed, the eNB needs to contain coverage and quality information in a handover requirement. A radio access network (RAN) node (i.e., RNC or base station sub-system (BSS)) of another RAT indicates the UE to continue to measure the source RAT (i.e., E-UTRAN) for a time. When the time indicated by the source RAT expires, the target RAT (e.g., UTRAN or (GERAN)) decides whether the target RAT needs to transmit an unnecessary inter-RAT handover report to the RAN node of the source RAT. However, currently neither the present RAN node of the RAT knows the information of the source cell, nor does the present RAN node of the RAT know the location information of the source cell. Accordingly, the present RAN node of the RAT cannot transmit the unnecessary inter-RAT handover report to the RAN node of the source RAT.

Further, for MRO between different RATs, the following issues may exist when an RLF report is transmitted. For example, for a too early handover from 3G or 2G to LTE, if shortly after an RNC hands over the UE successfully to eNB1, an RLF happens to the UE at eNB1, when the UE accesses LTE next time, the UE transmits a UE RLF report to an eNB (e.g., eNB2) where the UE accesses LTE a second time, the eNB2 transmits an RLF indication message to the eNB1, and the eNB1 determines the reason for the failure. If it is a too early inter-RAT handover, then the eNB1 needs to transmit a handover report to a source RNC, and since the handover is carried out between different systems, the eNB1 needs to transmit the handover report to the source RNC through a core network. If there is no X2 interface between the eNB1 and the eNB2, then the eNB2 needs to transmit the UE RLF report to the eNB1 via an S1 interface. However, how the eNB2 can know the detailed information of a cell that serves the UE last before the failure happens and how to transmit the UE RLF report to the eNB1 via the S1 interface are issues yet to be addressed in the current specifications.

The source base station and the source RAN node in an embodiment of the present disclosure are of a same concept, including an eNB in LTE, an RNC in UTRAN, or an RAN node BSS in GERAN.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting a handover report and a radio link failure (RLF) report, which are able to avoid influence on the user equipment (UE), reduce configuration of an operator, transmit the handover report or the RLF report to a source base station or a base station that serves the UE last before a failure happens, and improve the performance of a mobile communication system.

In accordance with an aspect of the present disclosure, a method for transmitting a handover report is provided. The method includes a target base station obtaining location information of a source cell or location information of a UE history cell during a handover procedure, and the target base station transmitting the handover report to a source base station or to a base station where the UE history cell is located, according to the obtained location information of the source cell or the location information of the UE history cell, the handover report including an unnecessary handover report, a too early handover report, or a handover to wrong cell report.

In an implementation, the target base station obtaining the location information of the source cell or the location information of the UE history cell includes UE history information transmitted from the source base station to the target base station containing location information of UE history cells, and the target base station obtaining the location information of the source cell or the location information of the UE history cell from the location information of the UE history cells.

In an implementation, when the UE history information contains both history cells visited by the UE in active mode and history cells visited by the UE in idle mode, the history cells visited in the active mode and the history cells visited in the idle mode are unified sorted, the history cells visited in the active mode and the history cells visited in the idle mode are placed in order based on time when the UE accesses to the history cells visited in the active mode and the history cells visited in the idle mode, and a history cell which is most recently visited is put first, or the history cells visited in the active mode and the history cells visited in the idle mode are respectively sorted, the history cells visited in the active mode and the history cells visited in the idle mode are placed in order based on time when the UE accesses to the history cells visited in the active mode and the history cells visited in the idle mode, and a history cell which is most recently visited is put first.

In an implementation, the target base station obtaining the location information of the source cell includes the source base station transmitting information of the source cell, and the information of the source cell including a cell identity of the source cell and the location information of the source cell.

In an implementation, the target base station obtains the location information of the source cell or the location information of the UE history cell by a relocation required message, a handover required message, a forward relocation request message, a relocation request message, or a handover request message.

In an implementation, when the UE history cell or the source cell is an evolved universal terrestrial radio access network (E-UTRAN) cell, information of the source cell or information of the UE history cell transmitted from the source base station to the target base station includes a base station type or base station identity of the base station where the UE history cell or the source cell is located, and the target base station determines a global base station identity of the base station where the UE history cell or the source cell is located according to the base station type or base station identity of the base station where the UE history cell or the source cell is located, for transmitting the handover report.

In an implementation, the target base station determining the global base station identity of the base station where the UE history cell or the source cell is located includes the target base station determining the base station type of the base station where the UE history cell or the source cell is located according to configuration or an E-UTRAN cell global identifier (ECGI) code or the location information of the UE history cell/source cell, and according to the determined base station type, extracting the global base station identity of the base station where the UE history cell or the source cell is located from an ECGI contained in the information of the UE history cell or information of the source cell, or the location information of the UE history cell or source cell transmitted from the source base station to the target base station comprising the base station identity of the base station where the UE history cell or the source cell is located, the target base station using the base station identity together with a public land mobile network (PLMN) identity contained in the ECGI of the UE history cell or source cell as the global base station identity of the base station where the UE history cell or the source cell is located, or the location information of the UE history cell or source cell transmitted from the source base station to the target base station comprises the global base station identity of the base station where the UE history cell or the source cell is located.

In an implementation, the base station type is macro base station or home evolved Node B (HeNB).

Extracting the global base station identity of the base station where the UE history cell or the source cell is located from the ECGI contained in the information of the UE history cell or information of the source cell includes when the base station type is macro base station, taking first 20 bits of an evolved cell identity (ECI) contained in the ECGI as the base station identity, when the base station type is HeNB, taking a value of the ECI as the base station identity, and taking the base station identity together with the PLMN identity contained in the ECGI as the global base station identity of the base station where the UE history cell or the source cell is located.

In an implementation, transmitting the handover report to the source base station or to the base station where the UE history cell is located includes the target base station transmitting the handover report to a target core network node, and including the location information of the source cell or the location information of the UE history cell obtained by the target base station in the handover report or in a message that carries the handover report, and the target core network node determining a source core network node or a core network node to which the eNB that controls the UE history cell connects according to the location information of the source cell or the location information of the UE history cell, and transmitting the message that carries the handover report to the source core network node or the core network node to which the eNB that controls the UE history cell connects, the source core network node or the core network node to which the eNB that controls the UE history cell connects determining the source base station or the base station where the UE history cell is located according to the location information of the source cell or the location information of the UE history cell, and transmitting the handover report to the source base station or to the base station where the UE history cell is located.

In an implementation, when the source cell or UE history cell is an E-UTRAN cell, the location information of the source cell or the location information of the UE history cell is a tracking area identity (TAI) or tracking area code (TAC) of the source cell or UE history cell, when the source cell or the UE history cell is a UTRAN cell, the location information of the source cell or the location information of the UE history cell is: a location area identity (LAI) or location area code (LAC), and/or a routing area code (RAC), and/or a radio network controller (RNC) identity, and/or an expanded RNC identity of the source cell or UE history cell, and when the source cell or the UE history cell is a global system for mobile communication (GSM) enhanced data rate for GSM evolution radio access network (GERAN), the location information of the source cell or the location information of the UE history cell is an LAI or LAC, and/or an RAC, and/or a cell identity (CI) of the source cell or UE history cell.

In accordance with another aspect of the present disclosure, a method for transmitting an RLF report, when an RLF or a handover failure happens after a UE is handed over to a target system, the UE accesses to the target system again, if there is no an X2 interface between a second base station to which the UE accesses when the UE accesses to the target system and a first base station that serves the UE last before the RLF or handover failure happens is provided. The method includes the second base station receiving the RLF report transmitted by the UE, the second base station determining location information of the cell that serves the UE last before the RLF or handover failure happens and a base station identity of the first base station according to a cell identity of the cell that serves the UE last before the RLF or handover failure happens contained in the RLF report, and the second base station transmitting the RLF report to the first base station by an S1 message which carries a target node identity, the target node identity containing the location information and the base station identity of the first base station.

In an implementation, determining the location information of the cell that serves the UE last before the RLF or handover failure happens includes the second base station searching for location information of a cell corresponding to the cell identity of the cell that serves the UE last before the RLF or handover failure happens in a stored neighbor relation list.

In an implementation, when the RLF report contains a physical-layer cell identity (PCI) and frequency information of the cell that serves the UE last before the RLF or handover failure happens, determining the location information of the cell that serves the UE last before the RLF or handover failure happens includes the second base station determining the location information of the cell that serves the UE last before the RLF or handover failure happens by an automatic neighbor relations (ANR) procedure according to the PCI and frequency information of the cell that serves the UE last before the RLF or handover failure happens.

In an implementation, determining the location information of the cell that serves the UE last before the RLF or handover failure happens includes the second base station taking a TAI of a cell that the UE accesses to when the UE accesses to the target system again as the TAI of the cell that serves the UE last before the failure happens.

In an implementation, the method further includes the second base station receiving a mobility history report transmitted by the UE, and the second base station determining the location information of the cell that serves the UE last before the RLF or handover failure happens further according to information of UE history cells contained in the mobility history report.

In an implementation, the information of the UE history cells contains ECGIs and location information of the UE history cells, and determining the location information of the cell that serves the UE last before the RLF or handover failure happens includes determining the location information of the cell that serves the UE last before the RLF or handover failure happens according to the cell identity of the cell that serves the UE last before the RLF or handover failure happens, and the ECGIs and location information of the UE history cells.

In an implementation, when the cell identity of the cell that serves the UE last before the RLF or handover happens in the RLF report is an ECGI, determining the location information of the cell that serves the UE last before the RLF or handover failure happens includes the second base station determining the PCI and frequency information of the cell that serves the UE last before the RLF or handover happens according to a corresponding relation between the ECGIs and PCIs and frequency information of the UE history cells contained in the information of the UE history cells, and determining the location information of the cell that serves the UE last before the RLF or handover failure happens by using the ANR procedure.

In an implementation, the second base station transmitting the RLF report to the first base station by the S1 message includes the second base station transmitting the RLF report to a second core network node to which the second base station connects by the S1 message that carries the target node identity, the second core network node determining whether the second base station and the first base station are connected to a same core network node pool according to the location information contained in the target node identity, and the determination is yes, then the second core network node determining the first base station according to the base station identity of the first base station and transmitting the RLF report to the first base station, and if it is determined that the first base station and the second base station are connected to different core network node pools, then the second core network node determining a first core network node to which the first base station connects according to the location information contained in the target node identity, and transmitting the RLF report to the first core network node by the S1 message that carries the target node identity, and the first core network node determining the first base station according to the base station identity of the first base station contained in the target node identity, and transmitting the RLF report to the first base station.

In accordance with another aspect of the present disclosure, a base station apparatus is provided. The base station apparatus includes a location information obtaining unit and a transmitting unit, in which the location information obtaining unit is configured for a target base station of a handover to obtain location information of a source cell or location information of a UE history cell, and the transmitting unit is configured to transmit a handover report to a source base station or to a base station where the UE history cell is located, according to the obtained location information of the source cell or the location information of the UE history cell, the handover report including an unnecessary handover report, a too early handover report, or a handover to wrong cell report.

In accordance with another aspect of the present disclosure, a base station apparatus is provided. The base station apparatus includes an RLF report receiving unit, a location information determination unit and an RLF report transmitting unit, in which the RLF report receiving unit is configured to receive an RLF report transmitted by a UE, the location information determination unit is configured to determine location information of a cell that serves the UE last before a failure happens and a base station identity of a base station that serves the UE last before the failure happens according to a cell identity of the cell that serves the UE last before the failure happens, and the RLF report transmitting unit is configured to transmit the RLF report to the base station that serves the UE last before the failure happens by an S1 message that carries a target node identity, and the target node identity including the location information and the base station identity of the base station that serves the UE last before the failure happens.

In conclusion, in the method and apparatus for transmitting a handover report adopted by the present disclosure, a source base station notifies a target base station of information of a source cell or information of a UE history cell (UE history information) containing location information of the history cell. When the target base station needs to transmit a handover report to the source base station, the target base station routes the handover report to the source base station or a base station controller via a core network. Further, a method and an apparatus for transmitting an RLF report are disclosed. In the circumstance that after a handover, an RLF happens to the UE or the handover fails, when there is no X2 interface between a base station where the UE accesses to the target system again and a base station that serves the UE last before failure, the present disclosure discloses a method of obtaining routing information of the base station that serves the UE last before failure and transmitting the RLF report through the S1 interface. With the methods of the present disclosure, influence on the user equipment is avoided, configuration of an operator is reduced, thus the mobility robustness optimization (MRO) issue between different radio access technologies (RATs) is addressed and the system performance is improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
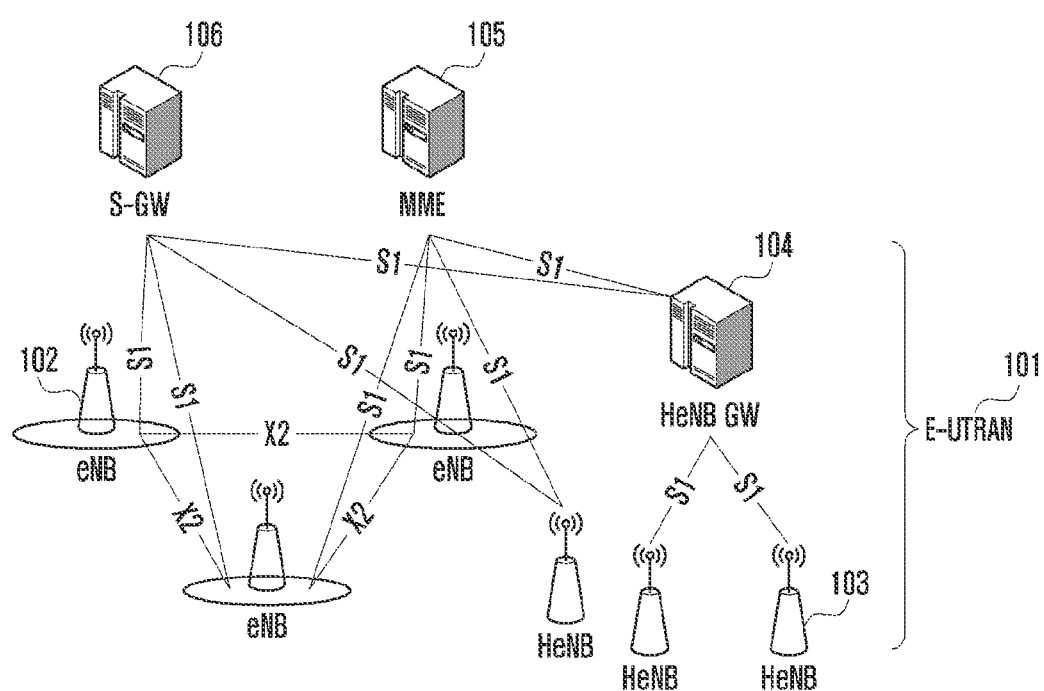
FIG. 1 illustrates a schematic diagram of a structure of a system architecture evolved (SAE) system according to the related art.
Figure 2:
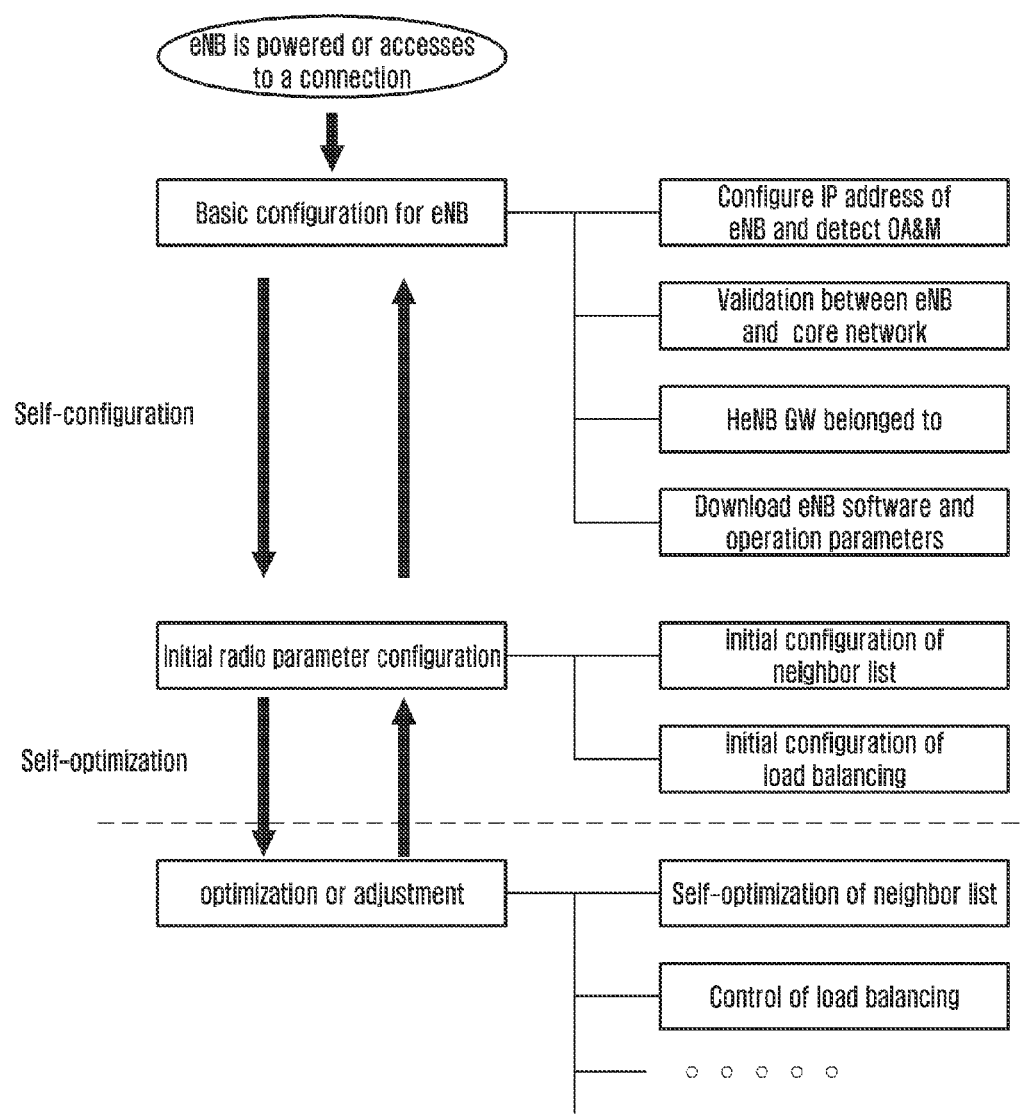
FIG. 2 is a flowchart illustrating a basic principle of performing self-optimization for an SAE system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A source base station and a source radio access network (RAN) node in an embodiment of the present disclosure are of a same concept, including an evolved Node-B (eNB) in long term evolution (LTE), a radio network controller (RNC) in universal terrestrial radio access network (UTRAN), or a base station sub-system (BSS) in global system for mobile communications (GSM) enhanced data rate for GSM evolution (EDGE) radio access network (GERAN).

To address the issue existing in the related art, a method for transmitting a handover report is provided. Specifically, provided with information of a source cell or location information of a history cell contained in user equipment (UE) history information notified by a source base station to a target base station, when the target base station needs to transmit a handover report to the source base station or to a base station where the UE history cell is located, the target base station uses the information of the source cell or the location information of the UE history cell received from the source base station to route a message to the source base station or to the base station where the history cell is located or a base station controller via a core network. Further, when information needs to be transmitted between a base station that is newly accessed to by the UE and a base station that serves the UE last before a failure happens and there is no X2 interfaces between the two base stations, a method of how to obtain routing information of the base station that serves the UE last before the failure happens and how to transmit an RLF report via an S1 interface is provided. With the method of the present disclosure, influence on the user equipment is avoided, an operator's configuration is reduced, so that the mobility robustness optimization (MRO) issue between different radio access technologies (RATs) is addressed and the system performance is improved.

Figure 3:
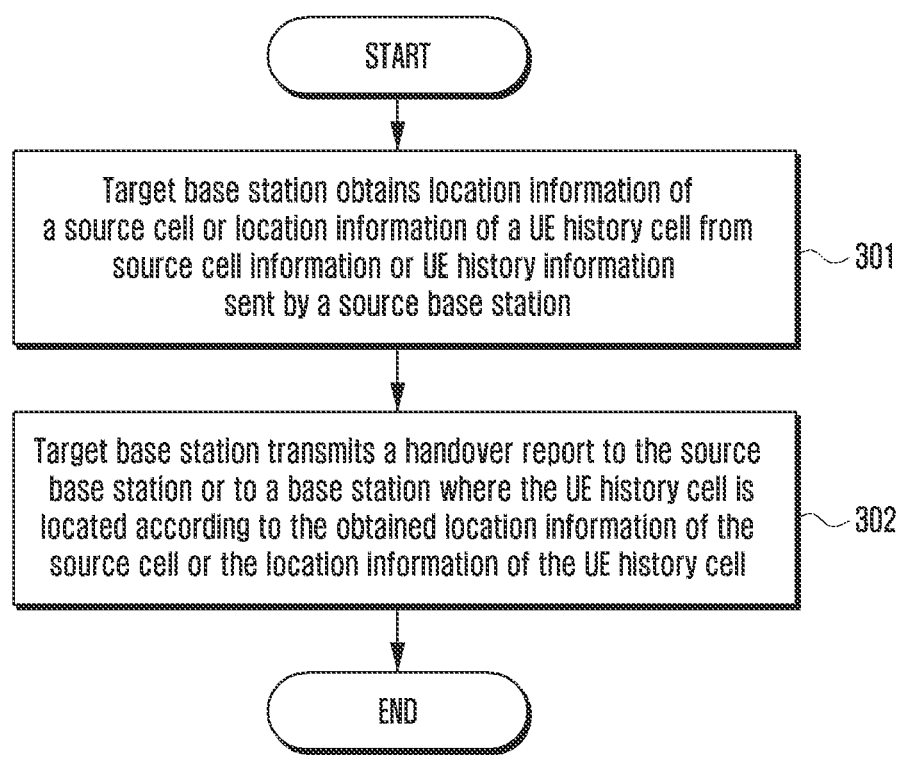
FIG. 3 illustrates a schematic diagram of a basic work flow of a method for transmitting a handover report according to an embodiment of the present disclosure.

FIG. 3 illustrates a schematic diagram of a basic work flow of a method for transmitting a handover report according to an embodiment of the present disclosure. As shown in FIG. 3, the flow includes the following operations.

Referring to FIG. 3, at operation 301, a target base station obtains location information of a source cell or location information of a UE history cell from the source cell information or UE history information transmitted from a source base station.

The target base station obtains the location information of the source cell or the location information of the history cell visited by the UE in two methods. The first method is that the source base station includes the location information of the history cell visited by the UE into the UE history information transmitted to the target base station.

Specifically, if the UE history cell is an evolved UTRAN (E-UTRAN) cell, then the location information of the UE history cell contains a tracking area identity (TAI) or tracking area code (TAC) of the UE history cell. If the UE history cell is an E-UTRAN cell, since cell information in UE history information originally contains information, such as cell global identity, cell type, time UE stayed in cell, and the like, when the location information of the UE history cell is added, the cell information in the UE history information contains a cell global identity, a TAI or TAC of the cell, a cell type, time the UE stayed in the cell, and the like. If the UE history cell is an E-UTRAN cell, the location information of the UE history cell may also contain a base station type or a base station identity of a base station where the UE history cell is located, the target base station determines a global base station identity of the base station where the UE history cell is located according to the base station type or base station identity of the base station where the UE history cell is located, and uses the global base station identity for subsequently transmitting the handover report. Specifically, the target base station may know the global base station identity of the source LTE base station through the following three method.

Method 1: Knowing from ECGI

In the information of the UE history cell transmitted from the source base station to the target base station, a cell identity (E-UTRAN cell global identifier (ECGI)) is contained. The target base station knows the base station type of the source base station according to configuration or according to an ECGI code, and extracts a global base station identity of the base station where the UE history cell is located from the ECGI according to the base station type, e.g., determining whether the base station type is macro base station or home eNB (HeNB). If the base station type is macro base station, the first 20 bits of an evolved cell identity (ECI) contained in the ECGI is the base station identity, and if the base station type is HeNB, then the ECI is the base station identity. The base station identity together with the public land mobile network (PLMN) identity is the global base station identity of the source base station.

Method 2: Knowing from ECGI

The source base station further includes the base station type of the base station where the UE history cell is located in the location information of the UE history cell. The target base station obtains the global base station identity of the source base station from the ECGI and the base station type received from the source base station. For example, if the base station type is macro base station, then the first 20 bits of the ECI included in the ECGI is the base station identity. If the base station type is HeNB, then the ECI is the base station identity. The base station identity together with the PLMN identity is the global base station identity of the source base station.

Method 3: The Source Base Station Includes the Base Station Identity or Global Base Station Identity of the Base Station Where the UE History Cell is Located in the Location Information of the UE History Cell If the base station identity is included, then the target base station knows the PLMN identity according to the ECGI. The target base station knows the global base station identity of the source base station from the source base station.

When the target base station needs to transmit information to the source base station via a Router Interface Marking (RIM) message, the target base station may include the TAI and the global base station identity in an RIM routing address. When the target base station needs to use the TAI of the source cell and/or the global base station identity of the source base station to route other messages to the source base station via a core network, the target base station may include the TAI and/or the global base station identity in the messages.

If the UE history cell is a UTRAN cell, then the location information of the UE history cell contains a location area identity (LAI) or location area code (LAC), and/or a routing area code (RAC), and/or an RNC identity, and/or an expanded RNC identity of the UE history cell. In addition, when the UE history cell is a UTRAN cell, since cell information in UE history information originally contains a UTRAN cell identity, a cell type, and time UE stayed in cell, therefore, when the location information of the UE history cell is added, the cell information in the UE history information contains the UTRAN cell identity, the cell type, the time UE stayed in cell, and the location information of the UE history cell.

If the UE history cell is a GERAN cell, then the location information of the UE history cell contains an LAI or LAC, and/or an RAC, and/or a cell identity (CI) of the UE history cell. In addition, if the UE history cell is a GERAN cell, since cell information in UE history information originally contains a GERAN cell identity, time UE stayed in cell, and the like, therefore, when the location information of the UE history cell is added, the cell information in the UE history information contains the GERAN cell identity, the LAI or LAC, and/or the RAC, and/or the CI of the GERAN cell, time the UE stayed in the GERAN cell, and the like.

The target base station determines the location information of the source cell or the location information of the UE history cell from the location information of the UE history cells.

The second method of the target base station obtaining the location information of the source cell is that the source base station transmits the source cell information which includes a cell identity of the source cell and location information of the source cell, to the target base station. Different RATs may have different types of location information, for information referring to the description of the location information of the UE history cell.

The source base station notifies a base station where the target cell is located the location information of the source cell or the location information of the UE history cell by a relocation required message or a handover required message, a forward relocation request message, a relocation request message or a handover request message, or may transmit the location information of the source cell or the location information of the UE history cell to the base station controlling the target cell by a source-to-target transparent container contained in the messages.

The UE history information may only contain information of cells that serve the UE in active mode before the UE accesses to the target cell, and a most recently visited cell is put first. The UE history information may contain information of cells that are camped by the UE in idle mode as well, and the information of cells that are camped by the UE in idle mode is the same as the information of cells that are visited by the UE in connected mode. In the circumstance that the UE history information both contains history cells visited by the UE in active mode and history cells visited by the UE in idle mode, the cells may be sorted according to an order in which the UE accesses to the cells, and a most recently visited cell is put first. Or the history cells visited by the UE in active mode and the history cells visited by the UE in idle mode are sorted separately, and a most recently visited cell is put first.

At operation 302, when the target base station needs to transmit a handover report to the base station where the source cell of the UE or the UE history cell is located, the target base station transmits the handover report to the source base station or to the base station where the UE history cell is located according to the obtained location information of the source cell or the location information of the UE history cell.

As described above, the base station and the RAN access point are of a same concept.

Specifically, when the target base station detects that the base station of the source cell triggers an improper inter-RAT handover to a target cell, the base station of the target access system transmits a handover report to the base station where the source cell is located to notify the base station where the source cell is located of the improper inter-RAT handover, e.g., an unnecessary inter-RAT handover, a too early inter-RAT handover, or a handover to wrong RAT. A message that carries the handover report contains a cell identity of the source cell and the location information of the source cell. The location information may be a LAI or LAC of the source cell, and/or an RAC of the source cell, and/or an RNC identity of the source cell, and/or an expanded RNC identity of the source cell, and/or a TAI of the source cell, and/or a base station type or base station identity or global base station identity of the base station where the source cell is located.

Specifically, the target base station first transmits the message that carries the handover report to a target core network node (e.g., a mobility management entity (MME) or serving general packet radio service (GPRS) support node (SGSN) or mobile switching center (MSC)), the target core network node finds a source core network node (e.g., an SGSN or MSC or MME) according to the LAI or RAC or TAI of the source cell or the UE history cell. Then the source core network node finds the source base station or the base station where the UE history cell is located (e.g., an RNC or eNB or BSS) according to the RNC identity, or the source cell identity, or the source base station identity (a base station identity or a global base station identity), or the CI. Specifically, if the source access system is $3^{rd}$ Generation (3G), then the target core network node finds the source SGSN according to the LAI, and/or RAC. If the source access system is LTE, then the target core network node finds the source MME according to the TAI or TAC. If the source access system is $2^{nd}$ Generation (2G), then the target core network node finds the source MSC according to the LAI or LAC, and/or RAC. If the source access system is 3G, then the source SGSN finds the source base station (i.e., a source RNC) according to the RNC identity or expanded PNC identity of the source cell. If the source access system is LTE, then the source MME finds the source base station eNB according to the source cell identity or the source base station identity (a base station identity or a global base station identity). And if the source access system is 2G, then the source MSC finds the source base station (i.e., a source BSS) according to the CI.

At this point, the description of the overall work flow of the method for transmitting a handover report according to the present disclosure is completed.

Figure 4:
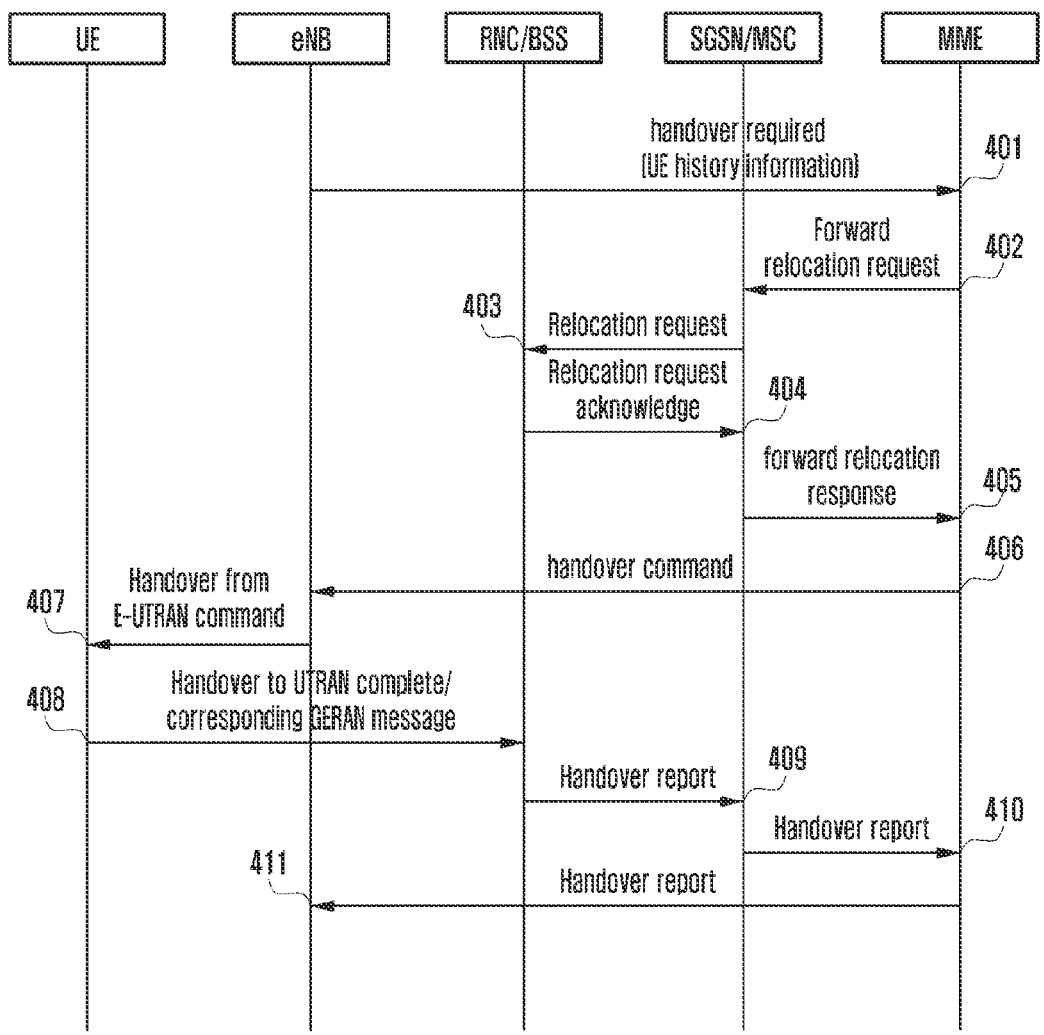
FIG. 4 illustrates a flow diagram of a method for transmitting a handover report according to a first embodiment of the present disclosure.

FIG. 4 illustrates a flow diagram of a method for transmitting a handover report according to a first embodiment of the present disclosure. Handover from LTE to 2G or 3G is used as an example to illustrate transmission of an unnecessary handover report. Herein operations irrelevant to the present disclosure will be omitted. As shown in FIG. 4, the flow includes the following operations.

Referring to FIG. 4, at operation 401, an eNB decides to perform a handover. The eNB transmits a handover required message to an MME.

UE history information contained in the handover required message contains location information of history cells that have been visited by the UE, and information of the location information of the history cells that have been visited by the UE is the same as that in operation 301, and will not be elaborated herein. The handover required message contains coverage and quality condition information.

The UE history information may only contain information of cells that serve the UE in active mode before the UE accesses to a target cell, and a most recently visited cell is put first. The UE history information may contain information of cells that are camped by the UE in idle mode as well, and the information of cells that are camped by the UE in the idle mode is the same as the information of cells that are visited by the UE in connected mode. In the circumstance that the UE history information contains both history cells visited by the UE in active mode and history cells visited by the UE in idle mode, the cells may be sorted according to an order in which the UE accesses to the cells, and a most recently visited cell is put first. Or the history cells visited by the UE in active mode and the history cells visited by the UE in idle mode are sorted separately, and a most recently visited cell is put first.

At operation 402, the MME transmits a forward relocation request message to an SGSN/MSC. If the target cell is a UTRAN cell, then the target core network node is an SGSN, and if the target cell is a GERAN cell, then the target core network node is an MSC.

UE history information contained in the forward relocation request message contains location information of history cells that have been visited by the UE, and information of the location information of the history cells that have been visited by the UE is the same as that in operation 301, and will not be elaborated herein.

At operation 403, the SGSN/MSC transmits a relocation request message to an RNC/BSS. If the target cell is a UTRAN cell, then the target core network node is an SGSN, and the target radio access network node is an RNC. If the target cell is a GERAN cell, then the target core network node is an MSC, and the target radio access network node is a BSS.

UE history information contained in the relocation request message contains location information of history cells that have been visited by the UE, and information of the location information of the history cells that have been visited by the UE is the same as that in operation 301, and will not be elaborated herein. The RNC or BSS stores the received UE history information.

At operation 404, the RNC/BSS transmits a relocation request acknowledgement message to the SGSN/MSC.

At operation 405, the SGSN/MSC transmits a forward relocation response message to the MME.

At operation 406, the MME transmits a relocation command message to the eNB.

At operation 407, the eNB transmits a handover from E-UTRAN command message to the UE.

At operation 408, the UE transmits a handover to UTRAN completion message to the RNC or transmits a corresponding GERAN message to the BSS.

If the RNC/BSS receives coverage and quality condition information from the handover request message, the RNC/BSS instructs the UE to continue to measure the source radio access system E-UTRAN after the UE connects to the UTRAN/GERAN for a time, and transmits a measurement report to the RNC/BSS. When the specified time expires, the RNC/BSS determines whether the RNC/BSS needs to transmit an unnecessary inter-RAT handover to the source base station according to the measurement report received from the UE or the coverage and quality condition received from the source base station. When the handover report needs to be transmitted, following operations will be executed.

At operation 409, the RNC/BSS transmits a handover report of unnecessary handover to the target core network node SGSN/MSC.

The message for transmission of the unnecessary inter-RAT handover contains a global base station identity of a base station where a source cell is located and a TAI of the source cell. The unnecessary inter-RAT handover report further contains a cell global identity of the source cell (ECGI). The RNC/BSS knows the cell identity of the source cell and the TAI of the source cell according to the received UE history information. The RNC/BSS knows the global base station identity of the source base station according to the cell global identity of the source cell or the received UE history information. Specifically, the RNC/BSS knows the global base station identity of the source base station according to the cell global identity of the source cell, or according to the cell global identity of the source cell and the source base station type, or directly according to the received global base station identity of the source base station. Since the most recent cell information contained in the UE history information is put first in the list.

At operation 410, the target core network node SGSN/MSG transmits the handover report to the source core network node MME.

The target core network node SGSN/MSC finds the source core network node MME according to the TAI of the source cell contained in the message for unnecessary inter-RAT handover transmission.

At operation 411, the source core network node MME transmits the handover report to a source base station eNB.

The source MME finds the source base station eNB according to the source cell identity or the source base station identity. And from the cell global identity of the source cell contained in the unnecessary inter-RAT handover report, the source base station knows from which cell to an RAT where the target base station is located the unnecessary handover to another RAT is triggered.

At this point, the description of the overall work flow of the method for transmitting a handover report according to a first embodiment of the present disclosure is completed.

Figure 5:
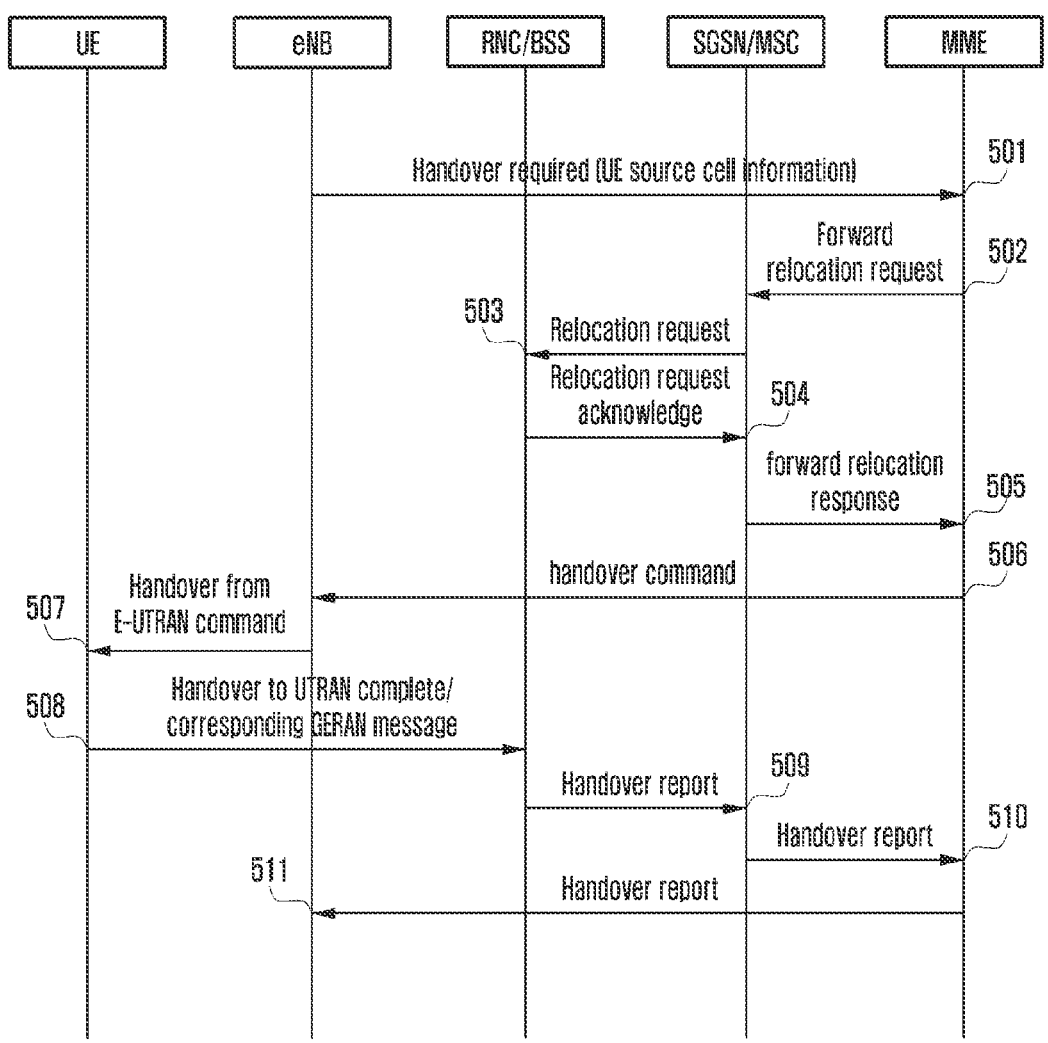
FIG. 5 illustrates a flow diagram of a method for transmitting a handover report according to a second embodiment of the present disclosure.

FIG. 5 illustrates a flow diagram of a method for transmitting a handover report according to a second embodiment of the present disclosure. Handover from LTE to 2G or 3G is used an example to illustrate transmission of an unnecessary handover report. Herein operations irrelevant to the present disclosure will be omitted. As shown in FIG. 5, the flow includes the following operations.

Referring to FIG. 5, at operation 501, an eNB decides to perform a handover. The eNB transmits a handover required message to an MME.

The message contains information of a source cell. The information of the source cell contains a cell identity of the source cell and location information of the source cell. Specifically, in an embodiment of the present disclosure, the location information of the source cell contains a TAI of the source cell. The location information of the source cell may also contain a base station type or base station identity of the base station where the source cell is located (a base station identity or a global base station identity). The target base station uses the determined or directly received global base station identity for subsequent transmission of the handover report. Specifically, the target base station may know the global base station identity of the source base station through the following three methods.

Method 1: Knowing From ECGI

In the information of the source cell transmitted from the source base station to the target base station, a source cell identity (ECGI) is contained. The target base station knows the base station type of the source base station according to configuration or according to an ECGI code, and extracts a global base station identity of the base station where the source cell is located from the ECGI according to the base station type, e.g., determining whether the base station type is macro base station or HeNB. If the base station type is macro base station, then the first 20 bits of an ECI contained in the ECGI is the base station identity, and if the base station type is HeNB, then the ECI is the base station identity. The base station identity together with the PLMN identity is the global base station identity of the source base station. Corresponding to this method, the location information of the source cell needs not to contain the base station type or base station identity of the base station where the source cell is located.

Method 2: Knowing From ECGI

The source base station further includes the base station type of the base station where the source cell is located in the location information of the source cell. The target base station obtains the global base station identity of the source base station from the ECGI and the base station type received from the source base station. For example, if the base station type is macro base station, then the first 20 bits of the ECI included in the ECGI is the base station identity. If the base station type is HeNB, then the ECI is the base station identity. The base station identity together with the PLMN identity is the global base station identity of the source base station.

Method 3: The Source Base Station Includes the Base Station Identity or Global Base Station Identity of the Base Station Where the Source Cell is Located in the Location Information of the Source Cell If the base station identity is included, then the target base station knows the PLMN identity according to the ECGI. The target base station knows the global base station identity of the source base station from the source base station.

When the target base station needs to transmit information to the source base station via an RIM message, the target base station may include the TAI and the global base station identity in an RIM routing address. When the target base station needs to use the TAI of the source cell and/or the global base station identity of the source base station to route other messages to the source base station via a core network, the target base station may include the TAI and/or the global base station identity in the messages.

The handover required message contains coverage and quality condition information.

At operation 502, the MME transmits a forward relocation request message to an SGSN/MSC. If a target cell is a UTRAN cell, then the target core network node is an SGSN, and if the target cell is a GERAN cell, then the target core network node is an MSC.

The forward relocation request message contains information of the source cell. The information of the source cell is the same as that in operation 501, which will not be elaborated herein.

At operation 503, the SGSN/MSC transmits a relocation request message to an RNC/BSS. If the target cell is a UTRAN cell, then the target core network node is an SGSN, and the target radio access network node is an RNC. If the target cell is a GERAN cell, then the target core network node is an MSC, and the target radio access network node is a BSS.

The relocation request message contains information of the source cell. The information of the source cell is the same as that in operation 501, and will not be elaborated herein. The RNC/BSS stores the information of the source cell.

At operation 504, the RNC/BSS transmits a relocation request acknowledgement message to the SGSN/MSC.

At operation 505, the SGSN/MSC transmits a forward relocation response message to the MME.

At operation 506, the MME transmits a relocation command message to the eNB.

At operation 507, the eNB transmits a handover from E-UTRAN command message to the UE.

At operation 508, the UE transmits a handover to UTRAN completion message to the RNC or transmits a corresponding GERAN message to the BSS.

If the RNC/BSS receives coverage and quality condition information from the handover request message, the RNC/BSS instructs the UE to continue to measure the source radio access system E-UTRAN after the UE connects to the UTRAN/GERAN for a time, and transmits a measurement report to the RNC/BSS. When the specified time expires, the RNC/BSS determines whether the RNC/BSS needs to transmit an unnecessary inter-RAT handover to the source base station according to the measurement report received from the UE or the coverage and quality condition received from the source base station. When the handover report needs to be transmitted, following operations will be executed.

At operation 509, the RNC/BSS transmits a handover report of unnecessary handover to the target core network node SGSN/MSC.

The message for transmission of the unnecessary inter-RAT handover contains a global base station identity of a base station where a source cell is located and a TAI of the source cell. The unnecessary inter-RAT handover report further contains a cell global identity of the source cell (ECGI). The RNC/BSS knows the cell identity of the source cell and the TAI of the source cell according to the received information of the source cell. The RNC/BSS knows the global base station identity of the source base station according to the cell global identity of the source cell or the received information of the source cell. Specifically, the RNC/BSS knows the global base station identity of the source base station according to the cell global identity of the source cell, or according to the cell global identity of the source cell and the source base station type, or directly according to the received global base station identity of the source base station.

At operation 510, the target core network node SGSN/MSG transmits the handover report to the source core network node MME.

The target core network node SGSN/MSC finds the source core network node MME according to the TAI of the source cell contained in the message for unnecessary inter-RAT handover transmission.

At operation 511, the source core network node MME transmits the handover report to a source base station eNB.

The source MME finds the source base station eNB according to the source cell identity or the source base station identity (a base station identity or a global base station identity). And from the cell global identity of the source cell contained in the unnecessary inter-RAT handover message, the source base station knows from which cell to an RAT where the target base station is located the unnecessary handover to another RAT is triggered.

Now, the description of the overall work flow of the method for transmitting a handover report according to the second embodiment of the present disclosure is completed.

Figure 6:
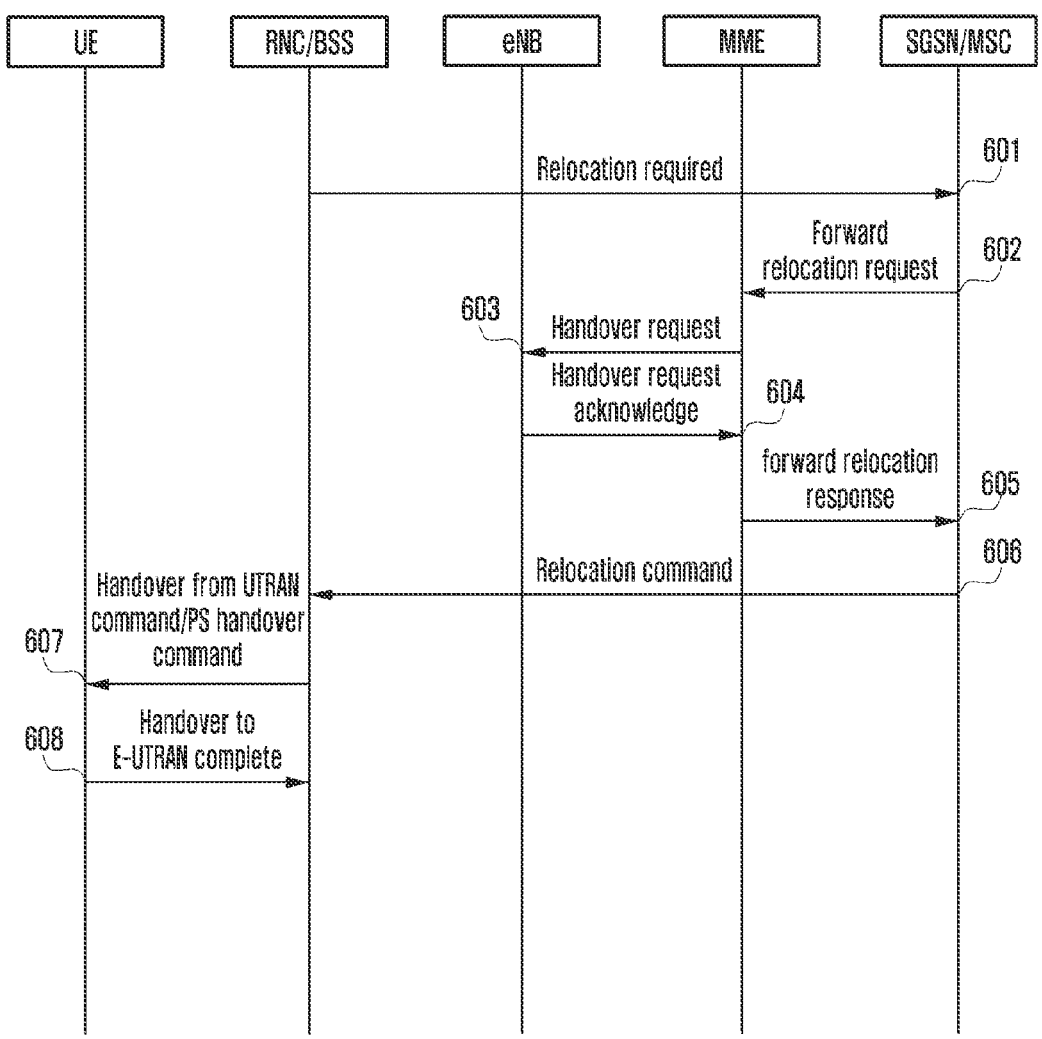
FIG. 6 illustrates a flow diagram of a method for transmitting a handover report according to a third embodiment of the present disclosure.

FIG. 6 illustrates a flow diagram of a method for transmitting a handover report according to a third embodiment of the present disclosure. Handover from 2G or 3G to LTE is used as an example to illustrate the method that a target base station obtains location information of a source base station. Herein operations irrelevant to the present disclosure will be omitted. As shown in FIG. 6, the flow includes the following operations.

Referring to FIG. 6, at operation 601, the RNC/BSS decides to perform a handover. The RNC/BSS transmits a relocation required message to the SGSN/MSC. If a source cell is a UTRAN cell, then the source radio access network node is an RNC, and the source core network node is an SGSN. If the source cell is a GERAN cell, then the source radio access network node is a BSS, and the source core network node is an MSC.

UE history information contained in the relocation required message contains location information of UE history cells, and information of the location information of the UE history cells is the same as that in operation 301, and will not be elaborated herein.

The UE history information may only contain information of cells that serve the UE in active mode before the UE accesses to a target cell, and a most recently visited cell is put first. The UE history information may contain information of cells that are camped by the UE in idle mode as well, and the information of cells that are camped by the UE in idle mode is the same as the information of cells that are visited by the UE in connected mode. In the circumstance that the UE history information contains both history cells visited by the UE in active mode and history cells visited by the UE in idle mode, the cells may be sorted according to an order in which the UE accesses to the cells, and a most recently visited cell is put first. Or the history cells visited by the UE in active mode and the history cells visited by the UE in idle mode are sorted separately, and a most recently visited cell is put first.

At operation 602, the SGSN/MSC transmits a forward relocation request message to the MME.

UE history information contained in the forward relocation request message contains location information of history cells that have been visited by the UE, and information of the location information of the history cells that have been visited by the UE is the same as that in operation 301, and will not be elaborated herein.

At operation 603, the MME transmits a handover request message to the eNB.

UE history information contained in the handover request message contains location information of history cells that have been visited by the UE, and information of the location information of the history cells that have been visited by the UE is the same as that in operation 301, and will not be elaborated herein. The eNB stores the received UE history information.

At operation 604, the eNB transmits a handover request acknowledgement message to the MME.

At operation 605, the MME transmits a forward relocation response message to the SGSN/MSC.

At operation 606, the SGSN/MSC transmits a relocation command message to the RNC/BSS.

At operation 607, the RNC/BSS transmits a handover from UTRAN command message or a packet switched (PS) handover command message to the UE.

At operation 608, the UE transmits a handover to E-UTRAN completion message to the RNC/BSS.

At this point, the description of the overall work flow of the method for transmitting a handover report according to the third embodiment of the present disclosure is completed.

Figure 7:
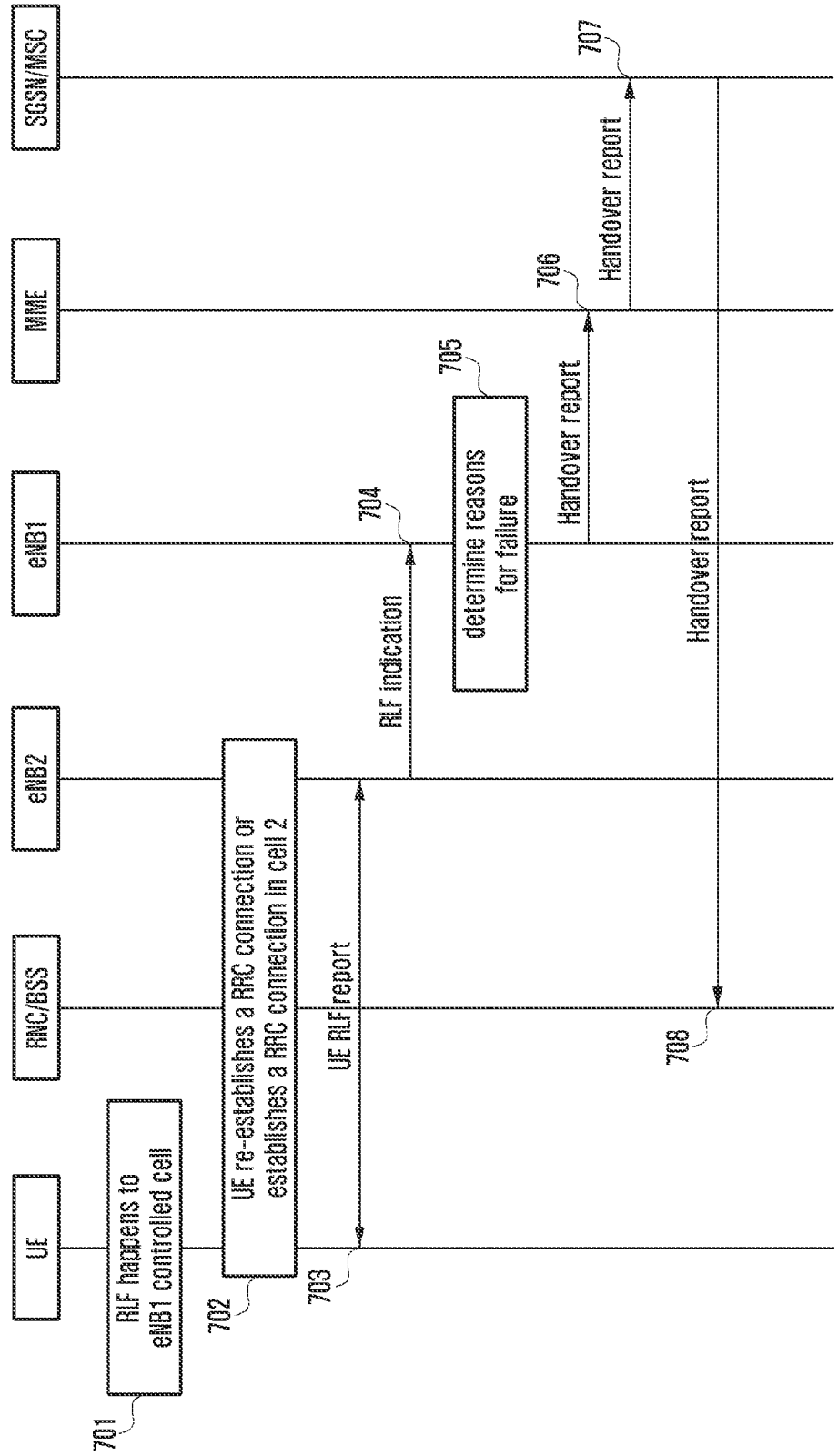
FIG. 7 illustrates a flow diagram of a method for transmitting a handover report according to a fourth embodiment of the present disclosure.

FIG. 7 illustrates a flow diagram of a method for transmitting a handover report according to a fourth embodiment of the present disclosure. In the embodiment of the present disclosure, the information received from the source base station during the handover procedure of the third embodiment shown in FIG. 6 is used. An embodiment of the present disclosure may be applied in the following scenario. If in the third embodiment of the present disclosure, shortly after the RNC/BSS hands over the UE successfully to eNB1, RLF happens to the UE in a cell of the eNB1, when the UE accesses to a LTE cell again, e.g., accessing cell 2 (a cell controlled by eNB2), or is handed over to the cell 2, the UE transmits stored RLF report information to the base station eNB2 where the cell 2 is located. When the UE accesses to the cell 1 and RLF happens, the UE may first access to a 3G cell, e.g., cell3, and then return and access to the LTE cell2 or then be handed over to the LTE cell 2. As shown in FIG. 7, the method includes the following operations.

Referring to FIG. 7, at operation 701, RLF happens to the UE in the cell of the eNB1.

At operation 702, when the UE returns to the LTE cell, for example the UE establishing an RRC connection in the cell 2 controlled by the LTE eNB2 or executing RRC connection re-establishment, or when the UE is handed over to the LTE cell 2, the UE indicates to the base station that the UE has RLF report information by transmitting an RRC connection establishment request or an RRC connection establishment completion or an RRC connection re-establishment request or an RRC connection re-establishment completion or handover completion or RRC connection re-configuration completion or other RRC messages to the base station.

At operation 703, the eNB2 requests the UE to report the RLF report information. The UE transmits the stored RLF report to the eNB2. The UE RLF report contains a cell identity of a cell that serves the UE last before the failure happens. The content of the UE RLF report is not what is concerned by the present disclosure, and will not be elaborated herein.

At operation 704, the eNB2 transmits an RLF indication message to the eNB1 that serves the UE last before the failure happens. The UE RLF report contains the cell identity of the cell that serves the UE last before the failure happens, and the eNB2 transmits the RLF report to the base station in which the cell where the RLF happens is located, i.e., eNB1. The RLF indication message contains the UE RLF report information received from the UE.

When there is an X2 interface between the eNB1 and the eNB2, the eNB2 may transmit the RLF report to the eNB1 directly. When there is no X2 interface, the eNB2 may transmit the RLF report to the eNB1 using an S1 interface according to a method provided below.

At operation 705, the eNB1 determines a reason for the failure, the determination method is not what is concerned in an embodiment of the present disclosure and will not be elaborated herein.

At operation 706, the eNB1 transmits a handover report carrying the reason for the failure, e.g., a too early inter-RAT handover, or a handover to wrong RAT, to a base station that triggers the handover.

Specifically, in an embodiment of present disclosure, the eNB1 transmits the handover report to the MME. The eNB1 may transmit the handover report to the MME by an eNB direct information transfer message or other S1 messages. The S1 message may contain an identity of a source cell that triggers the last handover, and the reason for the failure (e.g., too early inter-RAT handover or handover to wrong RAT or cell), and/or an identity of a target cell of the last handover. The S1 message may contain routing information.

If the base station that triggers the handover is a UTRAN base station, the routing information contains LAI, RAC and RNC identity of the cell that triggers the handover, and may also contain an expanded RNC identity of an RNC where the cell that triggers the handover is located (i.e., location information of a source cell). The eNB1 knows the LAI, RAC, RNC identity, and/or expanded RNC identity of the source UTRAN cell according to the UE history information received during the handover (e.g., through the flow in FIG. 6), as the most recent cell information contained in the UE visit history information is put first in the list. If the base station that triggers the handover is a GERAN base station, the routing information contains the LAI, RAC and CI of the cell that triggers the handover (i.e., location information of the source cell). The eNB1 knows the LAI, RAC, and CI of the source GERAN cell according to the UE history information received during the handover (e.g., through the flow in FIG. 6), as the most recent cell information in the UE visit history information is put first in the list.

At operation 707, the MME transmits a handover report to the SGSN/MSC. The MME finds the SGSN/MSC according to the routing information in the received message. The MME finds the source SGSN/MSC according to the received LAI, and/or RAC.

At operation 708, the SGSN/MSC transmits the received handover report to the RNC/BSS. If the source base station is a UTRAN base station, the SGSN finds a source RNC according to the RNC identity or expanded RNC identity in the received message. If the source base station is a GERAN base station, the SGSN finds a source BSS according to CI in the received message. The RNC/BSS makes statistics of MRO issues according to the reason for the failure contained in the received handover report and identities of a source cell and target cell of the last handover before the failure occurs.

At this point, the description of the overall work flow of the method for transmitting a handover report in which a first base station indicates a failure event to a second base station according to the fourth embodiment of the present disclosure is completed.

Figure 8:
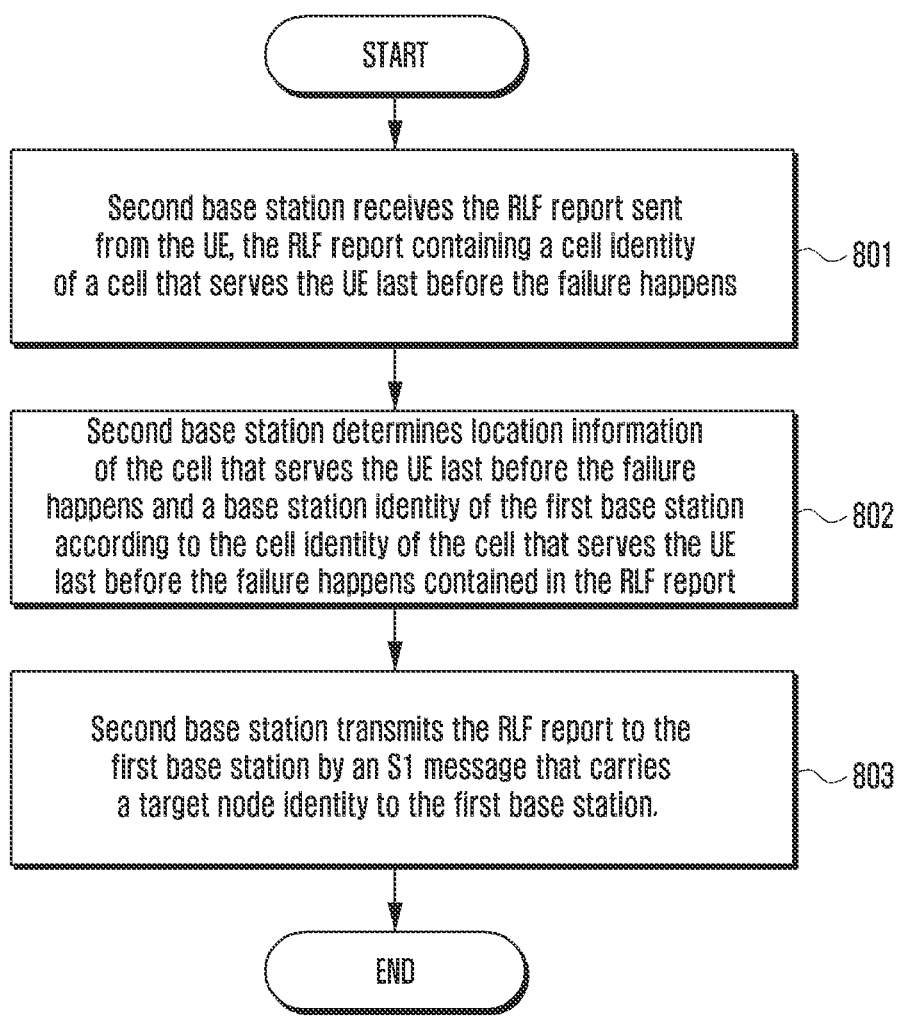
FIG. 8 is a flowchart illustrating a basic work flow of a method for transmitting a radio link failure (RLF) report according to an embodiment of the present disclosure.

FIG. 8 is a flowchart illustrating a basic flow of a method for transmitting an RLF report according to an embodiment of the present disclosure. The method is applicable for transmitting an RLF report in a scenario where after the UE is handed over to a target system and an RLF or handover failure happens, the UE accesses to the target system again, and there is no X2 interface between a base station accessed to by the UE in the target system after the failure (referred to as second base station hereafter) and a base station that serves the UE last before the failure happens. As shown in FIG. 8, the method includes the following operations.

Referring to FIG. 8, at operation 801, the second base station receives the RLF report transmitted by the UE, the RLF report containing a cell identity of a cell that serves the UE last before the failure occurs.

In an implementation, the second base station may request mobility history report information from the UE, the mobility history report information containing cell information of cells that have been visited by the UE. The cell information may include or not contain location information of the cells.

At operation 802, the second base station determines location information of the cell that serves the UE last before the failure occurs and a base station identity of the first base station according to the cell identity of the cell that serves the UE last before the failure occurs.

The second base station may obtain the base station identity of the first base station that serves the UE last before the failure occurs according to the cell identity of the cell that serves the UE last before the failure occurs.

The second base station may determine the location information of the cell that serves the UE last before the failure occurs according to the content in the RLF report directly by the following two methods. The first method is that if the UE RLF report contains a cell identity, ECGI or PCI, and frequency information of the cell that serves the UE last before the failure occurs, the second base station may search for the location information of the cell that corresponds to the cell identity of the cell that serves the UE last before the failure occurs in a neighbor relation table. If the cell that serves the UE last before the failure occurs and the cell of the second base station are not a neighbor relation, the corresponding location information may be unable to be found. The second method is that if the UE RLF report contains a cell identity, PCI, and frequency information of the cell that serves the UE last before the failure happens, an automatic neighbor relations (ANR) procedure may be used to determine the location information of the cell that serves the UE last before the failure occurs.

Further, when the second base station receives the mobility history report information transmitted from the UE, the second base station may determine the location information of the cell that serves the UE last before the failure occurs, with reference to the mobility history report information and the cell identity of the cell that serves the UE last before the failure occurs.

The first method may be that when the visit history cell information of the UE contains ECGI and location information of a history cell that has been visited by the UE, the location information of the cell that serves the UE last before the failure occurs may be determined according to the cell identity of the cell that serves the UE last before the failure occurs, and the ECGI and location information of the history cell that has been visited by the UE.

The second method may be that when the cell identity of the cell that serves the UE last before the failure occurs is an ECGI, the second base station may determine the PCI and frequency information of the cell that serves the UE last before the failure occurs according to a correspondence relation between the ECGI, PCI and frequency information of the history cell that has been visited by the UE in the UE visit history cell information, and use an ANR procedure to determine the location information of the cell that serves the UE last before the failure occurs.

At operation 803, the second base station transmits the RLF report to the first base station by an S1 message that carries a target node identity to the first base station. The target node identity includes the location information of the cell that serves the UE last before failure occurs and the base station identity of the first base station.

To be specific, the second base station transmits the RLF report to a second core network node to which the second bases station connects by the S1 message, and the second core network node determines a first core network node to which the first base station connects according to the location information of the cell that serves the UE last before failure occurs, and transmits the RLF report to the first core network node (this operation is unnecessary when the first core network node and the second core network node are a same node), and then the first core network node determines the first base station according to the base station identity of the first base station, and transmits the RLF report to the first base station.

The above method for transmitting the RLF report will be illustrated by way of the following two embodiments of the present disclosure.

Figure 9:
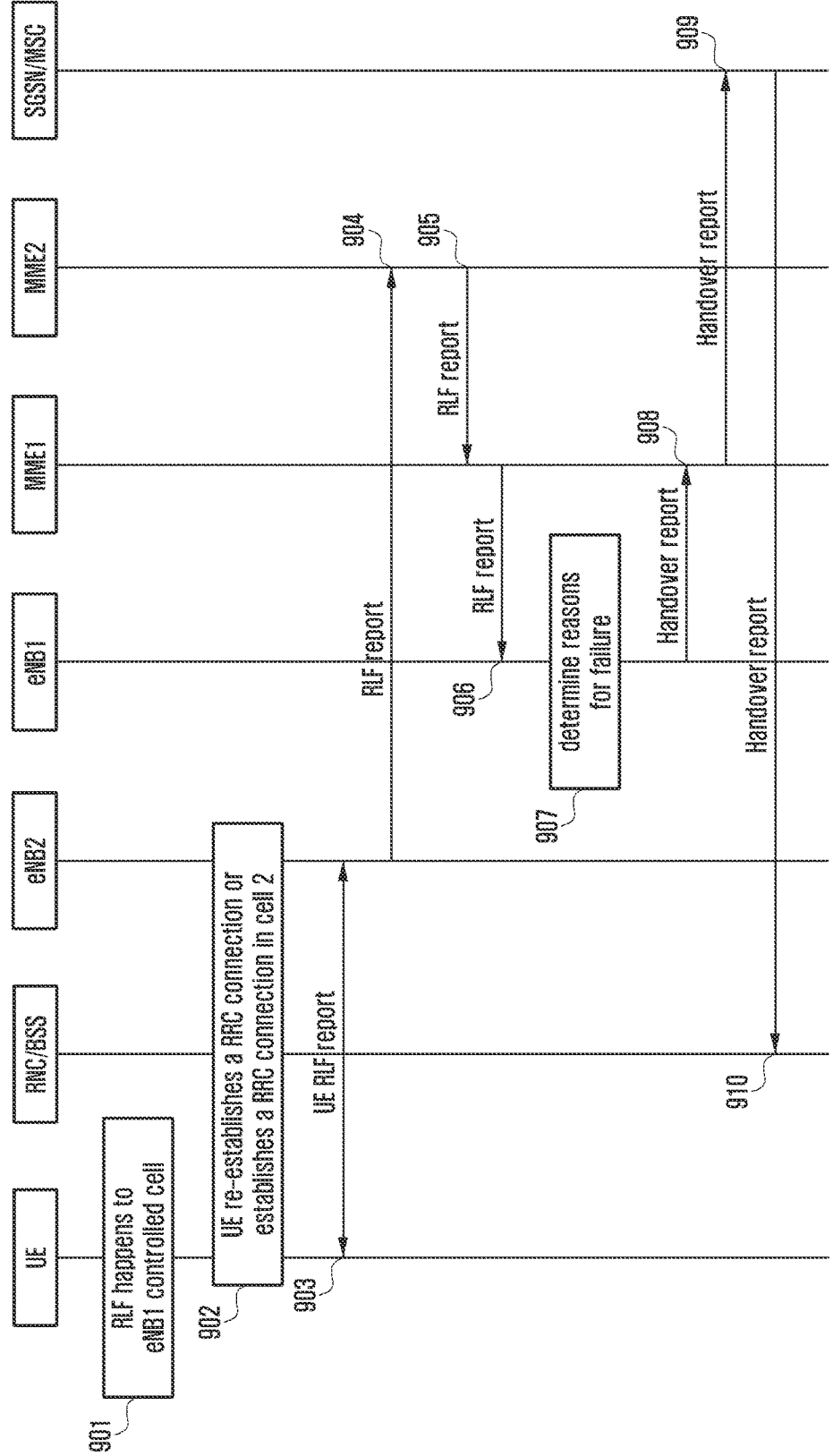
FIG. 9 illustrates a flow diagram of a method for transmitting an RLF report according to the first embodiment of the present disclosure.

FIG. 9 illustrates a flow diagram of a method for transmitting an RLF report according to the first embodiment of the present disclosure. Detailed description of operations that are irrelevant to the present disclosure will be omitted herein. In an embodiment of the present disclosure, besides of introduction on implementation of the method for transmitting the RLF report, implementation of handover report transmission based on the received RLF report will also be given. For example, the embodiment of present disclosure may be implemented in the following scenario. As shown in FIG. 6, shortly after the RNC/BSS successfully hands over the UE to eNB1, an RLF happens to the UE in a cell of the eNB1, when the UE accesses to a LTE cell (a cell controlled by eNB2), e.g., accessing to cell 2 or being handed over to the cell 2, the UE transmits stored RLF report information to the base station eNB2 where the cell 2 is located. When the UE accesses to the cell 1 and the RLF occurs, the UE may first access to a 3G cell, e.g., cell 3, and then return and access to the LTE cell2 or then be handed over to the LTE cell 2. As shown in FIG. 9, the method includes the following operations.

Referring to FIG. 9, at operation 901, the RLF happens to the UE in the cell of the eNB1.

At operation 902, when the UE returns to the LTE cell, for example the UE establishing an RRC connection in the cell 2 controlled by the LTE eNB2 or executing RRC connection re-establishment, or when the UE is handed over to the LTE cell 2, the UE indicates to the base station that the UE has RLF report information by transmitting an RRC connection establishment request or an RRC connection establishment completion or an RRC connection re-establishment request or an RRC connection re-establishment completion or handover completion or RRC connection re-configuration completion or other RRC messages to the base station. The UE may also indicate to the base station that the UE has mobility history information using the RRC connection re-establishment completion or above other RRC messages.

At operation 903, the eNB2 requests the UE to report the RLF report information. The eNB2 may request the UE to report the mobility history report information. The UE transmits the stored RLF report to the eNB2. The UE RLF report contains a cell identity of a cell that serves the UE last before the failure. The content of the UE RLF report is not what is concerned by the present disclosure, and will not be elaborated herein. The UE transmits the mobility history report to the eNB2. The mobility history report contains a list of cell information of cells that have been visited by the UE. The cell information of a cell that has been visited by the UE contains an ECGI, PCI, and frequency information of the cell, and time UE stayed in the cell. The cell information of the cell that has been visited by the UE also contains location information of the cell. For an E-UTRAN cell, the location information thereof is a TAI or TAC.

At operation 904, the eNB2 transmits the RLF report to the MME2.

The RLF report contains the cell identity of the cell that serves the UE last before the failure happens, and the eNB2 transmits the RLF report to the base station where the cell where the RLF occurs is located, i.e., eNB1, according to the cell identity. The eNB2 transmits the RLF report to the eNB1 by an RLF indication message. The RLF indication message contains the UE RLF report information received from the UE.

If there is no X2 interface between the eNB1 and the eNB2, the RLF report needs to be transmitted over the S1 interface. The eNB2 may transmit the RLF report to the eNB1 by an eNB configuration transfer message and an MME configuration transfer message, or by other S1 messages. The eNB2 transmits the eNB configuration transfer message or other S1 messages to the MME2. The S1 messages contain the UE RLF report. The S1 messages may contain an identity of a target base station, i.e., an identity of the base station eNB1. The identity of the target base station contains a CGI of the target base station and a selected TAI.

The method that the eNB2 determines the CGI of the target base station and the TAI of the cell that serves the UE last before failure is as follows.

The UE RLF report contains the cell identity of the cell that serves the UE last before failure, the cell information of the cell that has been visited by the UE contains the ECGI of the cell, the TAI or TAC of the cell, and the eNB2 knows the TAI of the cell that serves the UE last before failure according to the cell identity of the cell that serves the UE last before failure and the ECGI and TAI or TAC of the cell contained in the cell information of the cell that has been visited by the UE. The eNB2 knows the global eNB identity of the base station that serves the UE last before failure according to the cell identity of the cell that serves the UE last before failure.

A core network node MME2 to which the eNB2 connects knows whether the eNB1 and the eNB2 are connected to different MME pools according to the TAI in the target base station identity. If they connects to different MME pool, then the MME2 finds the core network node to which the eNB1 connects, i.e., target MME, such as MME1, according to the TAI. The MME2 transmits the UE RLF report to the MME1 at operation 905. At operation 906, the MME1 transmits the RLF report to the eNB1 by an MME configuration transfer message or other S1 messages.

At operation 907, the eNB1 determines a reason for the failure, and the determination method is not what concerned in an embodiment of the present disclosure and will not be elaborated herein.

At operation 908, the eNB1 transmits a handover report which carries the reason for the failure, e.g., a too early inter-RAT handover, or a handover to wrong RAT, to a base station that triggers the handover. In an embodiment of the present disclosure, the eNB1 transmits the handover report to the MME1. The eNB1 may transmit the handover report to the MME1 by an eNB direct information transfer message or other S1 messages. The S1 message may contain an identity of a source cell that triggers the handover and the reason for the failure (e.g., the two early inter-RAT handover or the handover to wrong RAT), and/or an identity of a target cell of the last handover. The S1 message may contain routing information. Specifically, if the base station that triggers the handover is a UTRAN base station, the routing information contains LAI, RAC and RNC identity of the cell that triggers the handover, and may also contain an expanded RNC identity of an RNC where the cell that triggers the handover is located (i.e., location information of a source cell). The eNB1 knows the LAI, RAC, RNC identity, and/or expanded RNC identity of the source UTRAN cell according to a method of an embodiment shown in FIG. 3, 4, 5 or 6. If the base station that triggers the handover is a GERAN base station, the routing information contains the LAI, RAC and CI of the cell that triggers the handover (i.e., location information of the source cell). The eNB1 knows the LAI, RAC, and CI of the source GERAN cell according to a method of an embodiment shown in FIG. 3, 4, 5, or 6.

At operation 909, the MME1 transmits the handover report to the SGSN/MSC. The MME1 finds the SGSN/MSC according to the routing information in the received message. The MME1 finds the source SGSN/MSC according to the received LAI, and/or RAC.

At operation 910, the SGSN/MSC transmits the received handover report to the RNC/BSS. If the source base station is a UTRAN base station, the SGSN finds a source RNC according to the RNC identity or expanded RNC identity in the received message. If the source base station is a GERAN base station, the SGSN finds a source BSS according to CI in the received message. The RNC/BSS makes statistics of MRO issues according to the reason of the failure contained in the received handover report and identities of a source cell and target cell of the last handover before the failure occurs.

At this point, the description of the overall work flow of the method for transmitting an RLF report according to the first embodiment of the present disclosure is completed.

Figure 10:
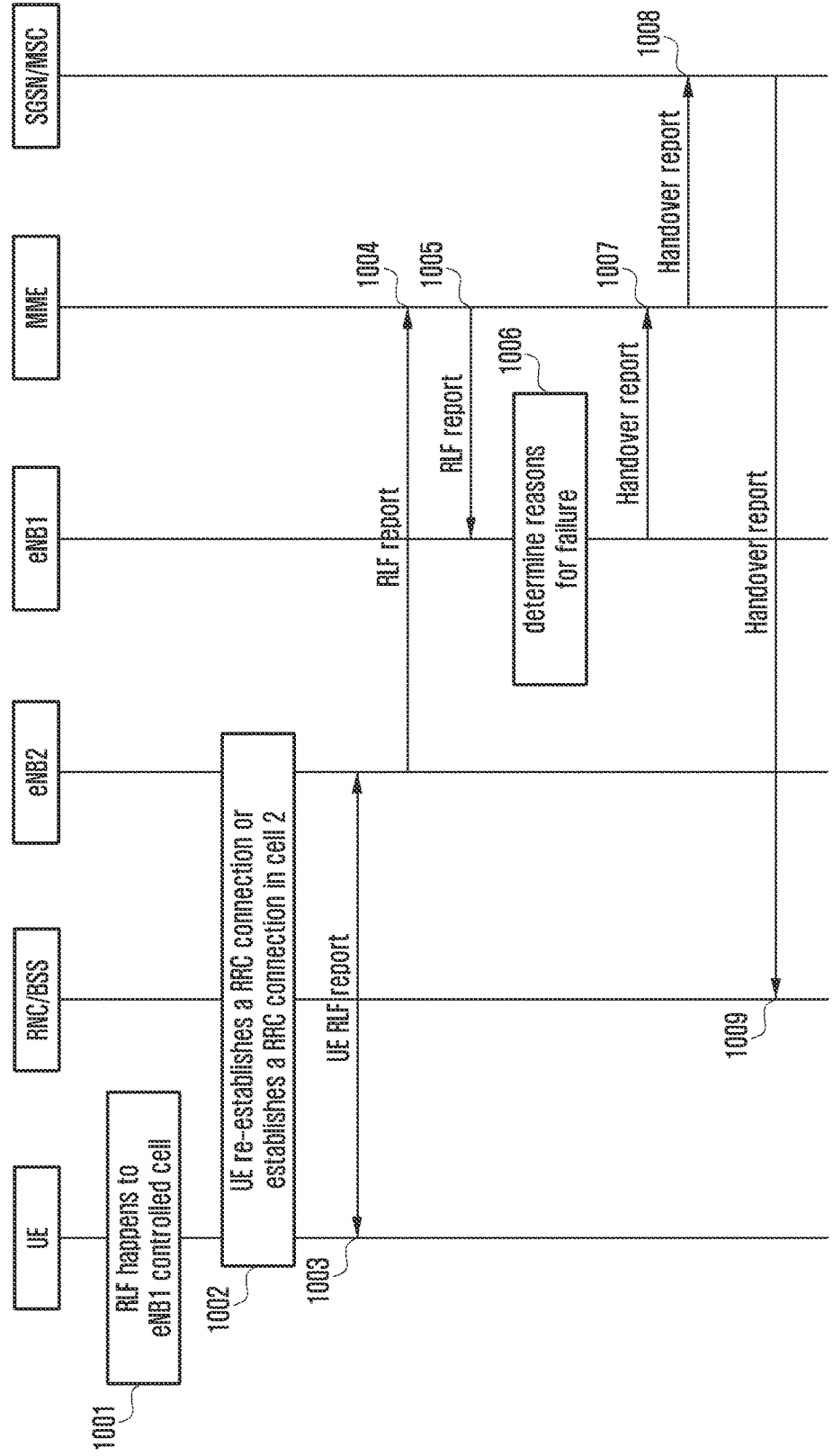
FIG. 10 illustrates a flow diagram of a method for transmitting an RLF report according to the second embodiment of the present disclosure.

FIG. 10 illustrates a flow diagram of a method for transmitting an RLF report according to the second embodiment of the present disclosure. Detailed description of operations that are irrelevant to the present disclosure will be omitted herein. Similar with that in the embodiment shown in FIG. 9, in an embodiment of the present disclosure, besides of introduction on implementation of the method for transmitting the RLF report, implementation of handover report transmission based on the received RLF report will also be given. For example, the embodiment of present disclosure may be implemented in the following scenario. As shown in FIG. 6, shortly after the RNC/BSS successfully hands over the UE to eNB1, an RLF happens to the UE in a cell of the eNB1, when the UE accesses to a LTE cell (a cell controlled by eNB2), e.g., accessing to cell 2 or being handed over to the cell 2, the UE transmits stored RLF report information to the base station where the cell 2 is located. When the UE accesses to the cell 1 and the RLF occurs, the UE may first access to a 3G cell, e.g., cell3, and then return and access to the LTE cell2 or then be handed over to the LTE cell 2. As shown in FIG. 10, the method includes the following operations.

Referring to FIG. 10, operations 1001 and 1002 are similar to operations 901 and 902, and will not be elaborated herein.

At operation 1003, the eNB2 requests the UE to report the RLF report information. The eNB2 may request the UE to report the mobility history report information. The UE transmits the stored RLF report to the eNB2. The UE RLF report contains a cell identity of a cell that serves the UE last before the failure. The content of the UE RLF report is not what is concerned by the present disclosure, and will not be elaborated herein. The UE transmits the mobility history report to the eNB2. The mobility history report contains a list of cell information of cells that have been visited by the UE. The cell information of a cell that has been visited by the UE contains an ECGI, PCI, and frequency information of the cell, and time the UE stayed in the cell. However, the cell information of the cell that has been visited by the UE does not contain location information of the cell.

At operation 1004, the eNB2 transmits the RLF report to the MME.

The RLF report contains the cell identity of the cell that serves the UE last before the failure happens, and the eNB2 transmits the RLF report to the base station where the cell where the RLF occurs is located, i.e., eNB1, according to the cell identity. The eNB2 transmits the RLF report to the eNB1 by an RLF indication message. The RLF indication message contains the UE RLF report information received from the UE.

If there is no X2 interface between the eNB1 and the eNB2, the RLF report needs to be transmitted over S1 interface. The eNB2 may transmit the RLF report to the eNB1 by an eNB configuration transfer message and an MME configuration transfer message, or by other S1 messages. The eNB2 transmits the eNB configuration transfer message or other S1 messages to the MME. The S1 messages contain the UE RLF report. The S1 messages may contain an identity of a target base station, i.e., an identity of the base station eNB1. The identity of the target base station contains a CGI of the target base station and a selected TAI.

The UE RLF report contain the cell identity of the cell that serves the UE last before failure, and the eNB2 knows the CGI of the cell that serves the UE last before failure according to the cell identity of the cell that serves the UE last before failure. The eNB2 may know a TAI of the cell that serves the UE last before failure by the following several methods.

Method 1, the UE RLF report contains an ECGI or PCI and frequency information of the cell that serves the UE last before failure, and there is a TAI of a cell corresponding to the ECGI and PCI in a neighbor relation list stored at the eNB2.

Method 2, the UE RLF report contains the cell identity PCI, and frequency information of the cell that serves the UE last before failure, and the eNB2 knows the TAI of the cell using an ANR procedure. The ANR procedure needs to use the PCI, and the ANR procedure is the same as that in related art, and will not be elaborated herein.

Method 3, if the cell identity of the cell that serves the UE last before failure in the UE RLF report is an ECGI, the eNB determines the PCI and frequency information of the cell that serves the UE last before failure according to the ECGI, PCI, and frequency information contained in the cell information of the cells that have been visited by the UE. The eNB2 know the TAI of the cell that serves the UE last before failure by using an ANR procedure. The ANR procedure may use the PCI, and the ANR procedure is the same as that in related art, and will not be elaborated.

Method 4, considering that the coverage of an MME pool is relative large, and normally the eNB1 and eNB2 in the above scenario are located in an MME pool, then the TAI of the cell where the UE establishes the RRC connection or where the UE re-accesses or where the UE re-establishes a connection is used as the TAI of the cell that serves the UE last before failure and is included into the S1 message.

By one of the above four methods, the TAI of the cell that serves the UE last before failure is determined. The eNB2 transmits the S1 message that carries the RLF report to a core network node MME to which the eNB2 connects. The S1 message may include a target node identity (i.e., target base station identity), and the MME knows whether the eNB1 and the eNB2 are connected with different MME pools according to the TAI in the target base station identity. And if they connect to different MME pool, then the MME2 finds the target MME according to the TAI, and transmits the UE RLF report to the target MME.

The MME or the target MME finds the eNB1 according to the ECGI in the target identity, and the MME transmits the RLF report to the eNB1 by an MME configuration transfer message or other S1 messages at operation 1005.

Corresponding to the method 4 of the UE obtaining the TAI of the cell that serves the UE last before failure, if the MME cannot find a corresponding base station according to the ECGI in the target identity, which indicates that the eNB1 and eNB2 belong to different MME pools, then the MME may discard the UE RLF report of this time.

The operations 1006 to 1009 are similar to operations 907 to 910, and will not be elaborated.

Now, the description of the overall work flow of the method for transmitting the RLF report in the second embodiment is completed.

The foregoing is the implementation of the method for transmitting an RLF report and a handover report according to the present disclosure. The present application also provides two kinds of bases station devices which can be used to implement the above method for transmitting the RLF report and the handover report.

Figure 11:
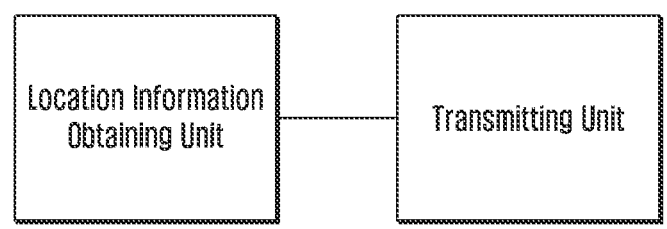
FIG. 11 illustrates a schematic diagram of a basic structure of a first base station device according to an embodiment of the present disclosure.

FIG. 11 illustrates a first base station device provided according to an embodiment of the present disclosure, which can be used to implement the method for transmitting the handover report according to the present disclosure.

Referring to FIG. 11, the base station device includes a location information obtaining unit and a transmitting unit.

The location information obtaining unit is used as a target base station of a handover to obtain location information of a source cell from a source base station or location information of history cells that have been visited by the UE, and transmits a handover report to base stations where the history cells that have been visited by the UE or to the source base station, in which the handover report may include an unnecessary handover report, a too early handover report or a handover to wrong cell report.

Figure 12:
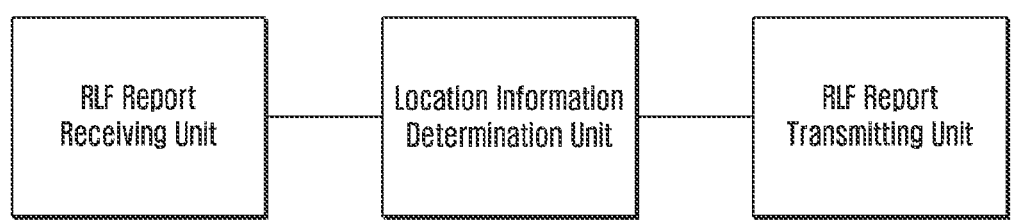
FIG. 12 illustrates a schematic diagram of a basic structure of a second base station device according to an embodiment of the present disclosure.

FIG. 12 illustrates a second base station device provided according to an embodiment of the present disclosure, which can be used to implement the method for transmitting the handover report according to the present disclosure.

Referring to FIG. 12, the base station device includes an RLF report receiving unit, a location information determination unit, and an RLF report transmitting unit.

The RLF report receiving unit is configured to receive an RLF report transmitted by the UE.

The location information determination unit is configured to determine location information of a cell that serves the UE last before failure and a base station identity of a base station that serves the UE last before failure.

The RLF report transmitting unit is configured to transmit the RLF report to the base station that serves the UE last before failure by an S1 message that carries a target node identity. The target node identity contains the location information of the cell that serves the UE last before failure and the base station identity of the base station that serves the UE last before failure.

The base station devices in FIGS. 11 and 12 may be located in a same physical entity, e.g., an eNB in a LTE system.

In conclusion, in the method and apparatus for transmitting a handover report adopted by the present disclosure, a source base station notifies a target base station of information of a source cell or information of a UE history cell (UE history information) containing location information of the history cell. When the target base station needs to transmit a handover report to the source base station, the target base station routes the handover report to the source base station or a base station controller via a core network. Further, a method and an apparatus for transmitting an RLF report are disclosed. In the circumstance that after a handover, an RLF happens to the UE or the handover fails, when there is no X2 interface between a base station where the UE accesses to the target system again and a base station that serves the UE last before failure, the present disclosure discloses a method of obtaining routing information of the base station that serves the UE last before failure and transmitting the RLF report through the S1 interface. With the methods of the present disclosure, influence on the user equipment is avoided, configuration of an operator is reduced, thus the MRO issue between different RATs is addressed and the system performance is improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first base station in a first radio access technology (RAT), the method comprising:
   receiving, from a second base station in a second RAT, a first message requesting an inter-RAT handover, the first message including location information and a cell identifier (ID) of a cell of the second base station;
   instructing a terminal to measure the second RAT while being connected to the first RAT;
   identifying whether the inter-RAT handover is unnecessary based on a result of measuring the second RAT; and
   transmitting, to the second base station, based on the location information and the cell ID, a second message indicating that the inter-RAT handover is unnecessary if the inter-RAT handover is unnecessary.

2. The method of claim 1, wherein the first message includes a second base station ID.

3. The method of claim 2, wherein, the second message includes the cell ID of the cell of the second base station, a cell ID of a cell of the first base station, and information on a type of the inter-RAT handover.

4. The method of claim 1, wherein the location information includes tracking area identity (TAI) and the cell ID includes E-UTRAN cell global identifier (ECGI) of the cell of the second base station.

5. The method of claim 4,
   wherein instructing the terminal further comprises receiving, by the first base station, a measurement report measured by the terminal; and
   wherein whether the inter-RAT handover is unnecessary is identified based on the measurement report.

6. The method of claim 1, wherein the first message is received from the second base station via mobility management entity (MME).

7. A method by a second base station in a second radio access technology (RAT), the method comprising:
   transmitting, to a first base station in a first RAT, a first message requesting an inter-RAT handover, the first message including location information and a cell identifier (ID) of a cell of the second base station; and
   receiving, from the first base station, based on the location information and the cell ID, a second message indicating that the inter-RAT handover is unnecessary if the inter-RAT handover is unnecessary,
   wherein the second message is transmitted from the first base station based on a result of measuring the second RAT while a terminal is connected to the first RAT.

8. The method of claim 7, wherein the first message includes a second base station ID.

9. The method of claim 7, wherein the second message includes the cell ID of the cell of the second base station, a cell ID of a cell of the first base station, and information on a type of the inter-RAT handover.

10. The method of claim 9, wherein the location information includes tracking area identity (TAI) and the cell ID includes E-UTRAN cell global identifier (ECGI) of the cell of the second base station.

11. The method of claim 7,
    wherein the first message is transmitted from the first base station to the second base station via mobility management entity (MME).

12. A first base station in a first radio access technology (RAT), the first base station comprising:
    a transceiver for transmitting and receiving a signal; and
    a processor configured to control for:
       receiving, from a second base station in a second RAT, a first message requesting an inter-RAT handover, the first message including location information and a cell identifier (ID) of a cell of the second base station,
       instructing a terminal to measure the second RAT while being connected to the first RAT,
       identifying whether the inter-RAT handover is unnecessary based on a result of measuring the second RAT, and
       transmitting, to the second base station, based on the location information and the cell ID, a second message indicating that the inter-RAT handover is unnecessary if the inter-RAT handover is unnecessary.

13. The first base station of claim 12, wherein the first message includes a second base station ID.

14. The first base station of claim 12, wherein the second message includes the cell ID of the cell of the second base station, a cell ID of a cell of the first base station, and information on a type of the inter-RAT handover.

15. The first base station of claim 14, wherein the location information includes tracking area identity (TAI) and the cell ID includes E-UTRAN cell global identifier (ECGI) of the cell of the second base station.

16. The first base station of claim 12, wherein the first message is received from the second base station via mobility management entity (MME).

17. The first base station of claim 12,
    wherein, the processor is further configured to control for receiving a measurement report measured by the terminal, and
    wherein whether the inter-RAT handover is unnecessary is identified based on the measurement report.

18. A second base station in a second radio access technology (RAT), the second base station comprising:
    a transceiver for transmitting and receiving a signal; and
    a processor configured to control for:
       transmitting, to a first base station in a first RAT, a first message requesting an inter-radio access technology (RAT) handover, the first message including location information and a cell identifier (ID) of a cell of the second base station, and
       receiving, from the first base station, based on the location information and the cell ID, a second message indicating that the inter-RAT handover is unnecessary if the inter-RAT handover is unnecessary,
    wherein the second message is transmitted from the first base station based on a result of measuring the second RAT while a terminal is connected to the first RAT.

19. The second base station of claim 18, wherein the first message includes a second base station ID.

20. The second base station of claim 18, wherein the second message includes the cell ID of the cell of the second base station, a cell ID of a cell of the first base station, and information on a type of the inter-RAT handover.

21. The second base station of claim 20, wherein the location information includes tracking area identity (TAI) and the cell ID includes E-UTRAN cell global identifier (ECGI) of the cell of the second base station.

22. The second base station of claim 18,
    wherein the first message is transmitted from the first base station to the second base station via mobility management entity (MME).

* * * * *